US008414384B2

(12) United States Patent
Walker et al.

(10) Patent No.: US 8,414,384 B2
(45) **Date of Patent: *Apr. 9, 2013**

(54) METHOD AND SYSTEM FOR MONITORING GAMING DEVICE PLAY AND DETERMINING COMPLIANCE STATUS

(75) Inventors: Jay S. Walker, Ridgefield, CT (US); James A. Jorasch, New York, NY (US); Geoffrey M. Gelman, Boston, MA (US); Stephen C. Tulley, Monroe, CT (US); Daniel E. Tedesco, Shelton, CT (US); Robert C. Tedesco, Fairfield, CT (US); Dean P. Alderucci, Westport, CT (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/156,668

(22) Filed: Jun. 9, 2011

(65) Prior Publication Data

US 2011/0244950 A1 Oct. 6, 2011

Related U.S. Application Data

(63) Continuation of application No. 11/434,309, filed on May 15, 2006, and a continuation-in-part of application No. PCT/US2005/028383, filed on Aug. 10, 2005.

(60) Provisional application No. 60/600,211, filed on Aug. 10, 2004, provisional application No. 60/600,646, filed on Aug. 11, 2004, provisional application No. 60/700,215, filed on Jul. 18, 2005.

(51) Int. Cl.
*A63F 9/24* (2006.01)
*A63F 13/00* (2006.01)

(52) U.S. Cl. ................. 463/25; 463/40; 463/42; 463/43

(58) Field of Classification Search ..................... 463/25
See application file for complete search history.

(56) References Cited

U.S. PATENT DOCUMENTS 5,178,390 A 1/1993 Okada
(Continued)

FOREIGN PATENT DOCUMENTS

| | | | |
|---|---|---|---|
| JP | 11-9806 | A | 1/1999 |
| JP | 2003-299867 | A | 10/2003 |
| JP | 2004-171523 | A | 6/2004 |
| WO | WO 03/025828 | | 3/2003 |

OTHER PUBLICATIONS

Supplementary European Search Report for PCT/US2005/028383.
Non-Final Office Action dated Jun. 19, 2009 for U.S. Appl. No. 11/303,385.
International Search Report for International Application No. PCT/US05/28383, Int'l Filing Date Aug. 10, 2005, mailed on Apr. 2, 2007.
Fey, Marshall, Slot Machines: A Pictorial History of the First 100 years, Liberty Belle Press, 1989, p. 162.

(Continued)

*Primary Examiner* — Steven J Hylinski
(74) *Attorney, Agent, or Firm* — Neal, Gerber & Eisenberg LLP

(57) ABSTRACT

After a player purchases a contract providing insurance against gambling losses, a server or other device in communication with a gaming device (e.g., a "player tracking" server, "slot accounting" server and/or other computer device) may operate to (i) receive game play data in association with one or more plays of the gaming device, (ii) determine a compliance status based on the received game play data and one or more play requirements associated with the contract, and (iii) provide a refund amount due to the player based on the compliance status. Before providing any refund, the server or other device may store a status indicator relating to the one or more plays indicating whether the play was compliant with the contract. Furthermore, an alert may be provided to the player if a particular play is not compliant with the contract.

23 Claims, 16 Drawing Sheets

U.S. PATENT DOCUMENTS

| | | | | |
|---|---|---|---|---|
| 5,766,075 | A | 6/1998 | Cook et al. | |
| 5,797,795 | A | 8/1998 | Takemoto et al. | |
| 5,910,048 | A | 6/1999 | Feinberg | |
| 6,077,163 | A | 6/2000 | Walker et al. | |
| 6,110,041 | A | 8/2000 | Walker et al. | |
| 6,113,493 | A | 9/2000 | Walker et al. | |
| 6,113,495 | A | 9/2000 | Walker et al. | |
| 6,238,288 | B1 | 5/2001 | Walker et al. | |
| 6,279,910 | B1 | 8/2001 | de Keller | |
| 6,283,474 | B1 | 9/2001 | de Keller | |
| 6,582,310 | B1 | 6/2003 | Walker et al. | |
| 6,645,075 | B1 | 11/2003 | Gatto et al. | |
| 6,719,291 | B1 | 4/2004 | de Keller | |
| 6,800,030 | B2 | 10/2004 | Acres | |
| 6,802,773 | B2 | 10/2004 | Moody | |
| 6,863,608 | B1 | 3/2005 | LeMay et al. | |
| 6,869,362 | B2 | 3/2005 | Walker et al. | |
| 7,140,964 | B2 | 11/2006 | Walker et al. | |
| 7,195,243 | B2 | 3/2007 | Kenny et al. | |
| 7,533,886 | B2 | 5/2009 | Kenny et al. | |
| 7,591,726 | B2 | 9/2009 | Baerlocher et al. | |
| 7,771,273 | B2 | 8/2010 | Walker et al. | |
| 7,771,275 | B2 | 8/2010 | Walker et al. | |
| 7,775,878 | B2 | 8/2010 | Walker et al. | |
| 7,775,879 | B2 | 8/2010 | Walker et al. | |
| 2002/0059379 | A1 | 5/2002 | Harvey et al. | |
| 2002/0082088 | A1 | 6/2002 | Nagashima | |
| 2002/0147040 | A1 | 10/2002 | Walker et al. | |
| 2002/0175468 | A1 | 11/2002 | Kenny et al. | |
| 2003/0003988 | A1 | 1/2003 | Walker et al. | |
| 2003/0013516 | A1 | 1/2003 | Walker et al. | |
| 2003/0027635 | A1 * | 2/2003 | Walker et al. | 463/40 |
| 2003/0028480 | A1 | 2/2003 | Rowe | |
| 2003/0220138 | A1 | 11/2003 | Walker et al. | |
| 2004/0030595 | A1 | 2/2004 | Park | |
| 2004/0147308 | A1 | 7/2004 | Walker et al. | |
| 2004/0147314 | A1 | 7/2004 | LeMay et al. | |
| 2005/0059482 | A1 | 3/2005 | Hedrick et al. | |

OTHER PUBLICATIONS

Written Opinion of the International Searching Authority for International Application No. PCT/US05/28383, Int'l Filing Date Aug. 10, 2005, mailed on Apr. 2, 2007.

Letter from Reina Kakimoto of Mots Law dated Dec. 6, 2011 regarding Third Party Submission in Published Application Under 37 C.F. R. 1.99 filed for U.S. Appl. No. 13/156,668 (1 page).

Third Party Submission in Published Application Under 37 C.F.R. 1.99 filed for U.S. Appl. No. 13/156,668, dated Dec. 6, 2011 (3 pages).

English translation of paragraph [0004] of JP2003-299867A submitted with Third Party Submission in Published Application Under 37 C.F.R. 1.99 for U.S. Appl, No. 13/156,668 (1 page).

Partially highlighted JP2003-299867A submitted with Third Party Submission in Published Application Under 37 C.F.R. 1.99 for U.S. Appl. No. 13/156,668 (2 pages).

Partially highlighted U.S. Patent Application Publication No. 2004/0030595 submitted with Third Party Submission in Published Application Under 37 C.F.R. 1.99 for U.S. Appl. No. 13/156,668 (2 pages).

Partial English translation of paragraph [0008] of JP2004-171523A submitted with Third Party Submission in Published Application Under 37 C.F.R. 1.99 for U.S. Appl. No. 13/156,668 (1 page).

Partially highlighted JP2004-171523A submitted with Third Party Submission in Published Application Under 37 C.F.R. 1.99 for U.S. Appl. No. 13/156,668 (3 pages).

Partially highlighted U.S. Appl. No. 5,178,390 submitted with Third Party Submission in Published Application Under 37 C.F.R. 1.99 for U.S. Appl. No. 13/156,668 (2 pages).

English translation of paragraph [0007] of JP11-9806A submitted with Third Party Submission in Published Application Under 37 C.F.R. 1.99 for U.S. Appl. No. 13/156,668 (1 page).

Partially highlighted JP11-9806A submitted with Third Party Submission in Published Application Under 37 C.F.R. 1.99 for U.S. Appl. No. 13/156,668 (2 pages).

* cited by examiner

42A

| PLAYER IDENTIFIER 44 | NAME 46 | ADDRESS 48 | MEMBER SINCE 50 | TOTAL WAGERED 52 | |
|---|---|---|---|---|---|
| P-000001 | R. JONES | 15 ELM STREET SPRINGTOWN, NY | 11/20/99 | $1,535.00 | |
| P-000002 | M. LOPEZ | 35 GUMDROP DR. CAPITAL CITY, CA | 7/28/04 | $168.50 | |
| ∘ ∘ ∘ | ∘ ∘ ∘ | ∘ ∘ ∘ | ∘ ∘ ∘ | ∘ ∘ ∘ | |
| P-106998 | C. WILLIAMS | 140 MAIN ST. PRAIRIEVILLE, ND | 1/15/93 | $19,754.25 | |
| P-106999 | K. SMITH | 65 BEACH LANE #1 BEACH CITY, NJ | 3/26/98 | $980.10 | |

FIG. 3A 42A (CONT.)

| THEORETICAL WIN 54 | ACTIVE CONTRACTS 56 | EXPIRED CONTRACTS 58 | HOTEL GUEST? 60 |
|---|---|---|---|
| $138.15 | GC-000760 | – | Y |
| $15.17 | – | – | Y |
| ⋮ | ⋮ | ⋮ | ⋮ |
| $1,777.88 | – | GC-000569, GC-000113 | N |
| $88.21 | – | – | N |

FIG. 3B

42B

| ELIGIBILITY RULE IDENTIFIER 62 | IF THE IDENTIFIED PLAYER... 64 | THEN... 66 | RULE STATUS 68 |
|---|---|---|---|
| R-001 | IS NOT A HOTEL GUEST OR DOES NOT HAVE A GUEST PASS | PLAYER IS NOT ELIGIBLE FOR ANY CONTRACT | ENABLED |
| R-002 | HAS AN ACTIVE CONTRACT | PLAYER IS NOT ELIGIBLE FOR ANY CONTRACT | ENABLED |
| R-003 | HAS GENERATED > $10,000 IN THEORETICAL WIN | PLAYER IS ELIGIBLE FOR ANY CONTRACT | ENABLED |
| ⋮ | ⋮ | ⋮ | ⋮ |
| R-00N | HAS NOT BEEN A MEMBER PRIOR TO 01/01/00 | PLAYER IS ELIGIBLE FOR CONTRACT WITH REFUND RATE < 51% | DISABLED |

FIG. 4

42C

| DEVICE TYPE IDENTIFIER 70 | DEVICE NAME 72 | MANUFACTURER 74 | LOCATION 76 | GAME TYPE 78 |
|---|---|---|---|---|
| D-000001 | GOLDEN NICKEL FRENZY | BIG GUY GAMING, INC. | ROOM A | 5-REEL SLOT |
| D-000002 | MEGAJACKPOT MANIA | SUPERFUN GAMING CORPORATION | ROOM A | 3-REEL SLOT |
| D-000003 | WILD 8'S POKER | GREAT POKER SYSTEMS, INC. | ROOM B | VIDEO POKER |
| ... | ... | ... | ... | ... |
| D-009999 | SLOT BONANZA | SUPERFUN GAMING CORPORATION | ROOM D | 5-REEL SLOT |

FIG. 5A 42C (CONT.)

| STANDARD DEVIATION 80 | PAYOUT PERCENTAGE 82 | TOP JACKPOT (CREDITS) 84 | DENOM. 86 |
|---|---|---|---|
| 3.134 | 91% | 1,200 | $0.05 |
| 11.177 | 93% | PROGRESSIVE | $0.25 |
| 7.018 | 92.7% | 1,000 | $1.00 |
| ... | ... | ... | ... |
| 9.405 | 89% | 5,000 | $0.25 |

FIG. 5B

42D

| ELIGIBILITY RULE IDENTIFIER 88 | IF THE GAMING DEVICE TYPE... 90 | THEN... 92 | RULE STATUS 94 |
|---|---|---|---|
| R-001 | HAS A "PROGRESSIVE" JACKPOT | GAMING DEVICE IS NOT ELIGIBLE FOR ANY CONTRACT | ENABLED |
| R-002 | HAS A PAYOUT PERCENTAGE > 95% | GAMING DEVICE IS NOT ELIGIBLE FOR ANY CONTRACT | ENABLED |
| R-003 | HAS A STANDARD DEVIATION METRIC > 6.00 | GAMING DEVICE IS NOT ELIGIBLE FOR ANY CONTRACT | ENABLED |
| ... | ... | ... | ... |
| R-00N | IS MANUFACTURED BY "COMPANY Z" | GAMING DEVICE IS NOT ELIGIBLE FOR ANY CONTRACT | DISABLED |

FIG. 6

42E

| CONTRACT RULE IDENTIFIER 96 | ASSOCIATED PARAMETER(S) 98 | THEN... 100 | RULE STATUS 102 |
|---|---|---|---|
| R-001 | REFUND RATE > 75%, CONTRACT FEE < $10 AND CONTRACT PERIOD < 1 HOUR | DO NOT PROVIDE THE GAMING CONTRACT | ENABLED |
| R-002 | MINIMUM RATE OF PLAY < 300 GAME PLAYS PER HOUR | DO NOT PROVIDE THE GAMING CONTRACT | ENABLED |
| R-003 | CONTRACT PERIOD > 24 HOURS | DO NOT PROVIDE THE GAMING CONTRACT | ENABLED |
| ... | ... | ... | ... |
| R-00N | REFUND RATE > %100 | DO NOT PROVIDE THE GAMING CONTRACT | DISABLED |

FIG. 7

42F

| CONTRACT IDENTIFIER 104 | PLAYER IDENTIFIER 106 | CONTRACT PERIOD 108 | REFUND RATE 110 | CONTRACT FEE 112 |
|---|---|---|---|---|
| C-000001 | P-000927 | 6 HOURS | 100% | $0.01 PER $0.25 WAGER |
| C-000002 | P-000763 | 10,000 GAME PLAYS | 50% | – |
| C-000003 | P-000165 | 9:00 AM - 3:00 PM | 100% | $40.00 |
| ∘ ∘ ∘ | ∘ ∘ ∘ | ∘ ∘ ∘ | ∘ ∘ ∘ | ∘ ∘ ∘ |
| C-00000N | P-001440 | 2 HOURS | 50% | $30.00 |

FIG. 8A 42F (CONT.)

| PLAY REQUIREMENT 114 | PERIOD REMAINING 116 | TOTAL WAGER 118 | TOTAL PAYOUT 120 | TOTAL LOSS 122 |
|---|---|---|---|---|
| 3:00 PM - 6:00 PM | 2 HOURS, 34 MINUTES | $395.50 | $181.75 | $213.75 |
| MIN. WAGER = $0.25 | 2,231 GAME PLAYS | $1,023.25 | $867.50 | $155.75 |
| 500 GAME PLAYS/HOUR | 5 HOURS, 50 MINUTES | $11.50 | $4.50 | $7.00 |
| ∘ ∘ ∘ | ∘ ∘ ∘ | ∘ ∘ ∘ | ∘ ∘ ∘ | ∘ ∘ ∘ |
| GD-000101 - GD-000599 | 11 MINUTES | $278.65 | $210.00 | $68.65 |

FIG. 8B

42G

| CONTRACT IDENTIFIER 124 | ELIGIBLE GAMING DEVICE(S) 126 | TIME 128 | DAY 130 | RATE OF PLAY 132 | CONTRACT FEE 134 | WAGER MIN. 136 | WAGER MAX. 138 |
|---|---|---|---|---|---|---|---|
| C-000001 | GD-000101 - GD-000599 | 3:00 PM - 6:00 PM | ANY | ANY | $0.01 PER $0.25 WAGER | $0.50 PER GAME PLAY | NONE |
| C-000002 | ALL | ANY | FRIDAY | ANY | PRE-PAID ($40.00 FLAT) | NONE | NONE |
| C-000003 | GD-000724 | ANY | MON. - THURS. | 500 GAME PLAYS/HOUR | NONE | NONE | $75.00 PER GAME PLAY |
| ⋮ | ⋮ | ⋮ | ⋮ | ⋮ | ⋮ | ⋮ | ⋮ |
| C-00000N | ROOM A | 12:00 PM - 9:00 PM | 11/14/05 | ANY | PRE-PAID ($25.00 FLAT) | $50.00 TOTAL | NONE |

FIG. 9

140

| GAMING CONTRACT IDENTIFIER: C-000001 | | | | | | |
|---|---|---|---|---|---|---|
| GAME PLAY 142 | GAMING DEVICE 144 | TIME 146 | OUTCOME 148 | WAGER 150 | PAYOUT 152 | COMPLIANCE STATUS 154 |
| 1 | GD-000192 | 3:10:52 PM | CH-CH-CH | $1.50 | $10.00 | COMPLIANT |
| 2 | GD-000192 | 3:11:11 PM | PL-PL-BAR | $0.25 | $0 | NOT COMPLIANT |
| 3 | GD-000192 | 3:11:24 PM | BL-LM-PL | $0.50 | $0 | COMPLIANT |
| ∘ ∘ ∘ | ∘ ∘ ∘ | ∘ ∘ ∘ | ∘ ∘ ∘ | ∘ ∘ ∘ | ∘ ∘ ∘ | ∘ ∘ ∘ |
| N | GD-000853 | 3:57:29 PM | OR-PL-OR | $1.00 | $0 | COMPLIANT |

FIG. 10

METHOD AND SYSTEM FOR MONITORING GAMING DEVICE PLAY AND DETERMINING COMPLIANCE STATUS

PRIORITY CLAIM

This application is a continuation application of, claims priority to and the benefit of U.S. patent application Ser. No. 11/434,309, filed on May 15, 2006, which claims priority to and the benefit of U.S. Provisional Application Ser. No. 60/700,215, filed on Jul. 18, 2005, and which also is a continuation-in-part application of, claims priority to and the benefit of International Patent Application Number PCT/US2005/28383, filed on Aug. 10, 2005, which claims priority to and the benefit of U.S. Provisional Patent Application No. 60/600,211, filed on Aug. 10, 2004 and which also claims priority to and the benefit of U.S. Provisional Patent Application No. 60/600,646, filed on Aug. 11, 2004, the entire contents of which are each incorporated by reference herein.

CROSS REFERENCE TO RELATED APPLICATIONS

The present application is also related to the following commonly-owned patents and patent applications: U.S. Pat. No. 6,113,493, entitled SYSTEM AND METHOD FOR GENERATING AND EXECUTING INSURANCE POLICIES FOR GAMBLING LOSSES; U.S. Pat. No. 6,077,163, entitled GAMING DEVICE FOR A FLAT RATE PLAY SESSION AND A METHOD OF OPERATING SAME; U.S. Pat. No. 6,869,362, entitled METHOD AND APPARATUS FOR PROVIDING INSURANCE POLICIES FOR GAMBLING LOSSES; U.S. Patent Application Publication No. 2003/0220138 entitled METHOD AND APPARATUS FOR EMPLOYING FLAT RATE PLAY; U.S. Patent Application Publication No. 2002/0147040 entitled GAMING DEVICE FOR A FLAT RATE PLAY SESSION AND A METHOD OF OPERATING SAME; and U.S. Patent Application Publication No. 2004/0147308, entitled SYSTEM AND METHOD FOR COMMUNICATING GAME SESSION INFORMATION, all of which are hereby incorporated by reference in their entireties.

FIELD OF THE INVENTION

The present invention relates to gaming contracts and in particular relates to tracking compliance with the terms of a gaming contract.

BRIEF DESCRIPTION OF THE DRAWINGS

FIGS. 3A & 3B illustrate an exemplary data structure of a player database according to some embodiments of the present invention.

FIG. 4 illustrates an exemplary data structure of a player eligibility database according to some embodiments of the present invention.

FIGS. 5A & 5B illustrate an exemplary data structure of a gaming device type database according to some embodiments of the present invention.

FIG. 6 illustrates an exemplary data structure of a gaming device eligibility database according to some embodiments of the present invention.

FIG. 7 illustrates an exemplary data structure of a gaming contract rules database according to some embodiments of the present invention.

FIGS. 8A & 8B illustrate an exemplary data structure of a gaming contract database according to some embodiments of the present invention.

FIG. 9 illustrates an exemplary data structure of a contract requirements database according to some embodiments of the present invention.

FIG. 10 illustrates an exemplary data structure of a contract outcomes database according to some embodiments of the present invention.

DETAILED DESCRIPTION OF THE INVENTION

Embodiments of the present invention allow flat rate play sessions in conjunction with insurance contracts that protect against gambling losses. A gaming establishment such as a casino provides gaming devices such that patrons may play on the gaming devices. In particular, a player may purchase a contract and gamble on the gaming devices. The gaming establishment and/or insurer monitor the player's gambling to determine if the player's gambling complies with the terms of the contract. These entities may store data associated with the play of the player. In an exemplary embodiment, the present invention stores an indication (e.g., a compliant status) as to whether particular game plays by the player are compliant with the terms of the contract. If the game play is not compliant, the player may be informed of the non-compliant nature of the game play and make an informed decision as to whether she wishes to proceed. After termination of the contract, the player may account with the insurer and/or the casino for gambling winnings and losses according to the terms of the contract.

Before addressing the particular embodiments of the present invention, a review of a gaming environment, the concepts of flat rate play, and the process of purchasing an insurance contract are provided with reference to FIGS. 1-8B. Embodiments of the present invention are discussed in detail beginning with reference to FIG. 9. Clarifying definitions are also provided for several terms under the section "Rules of Interpretation".

Figure 1:
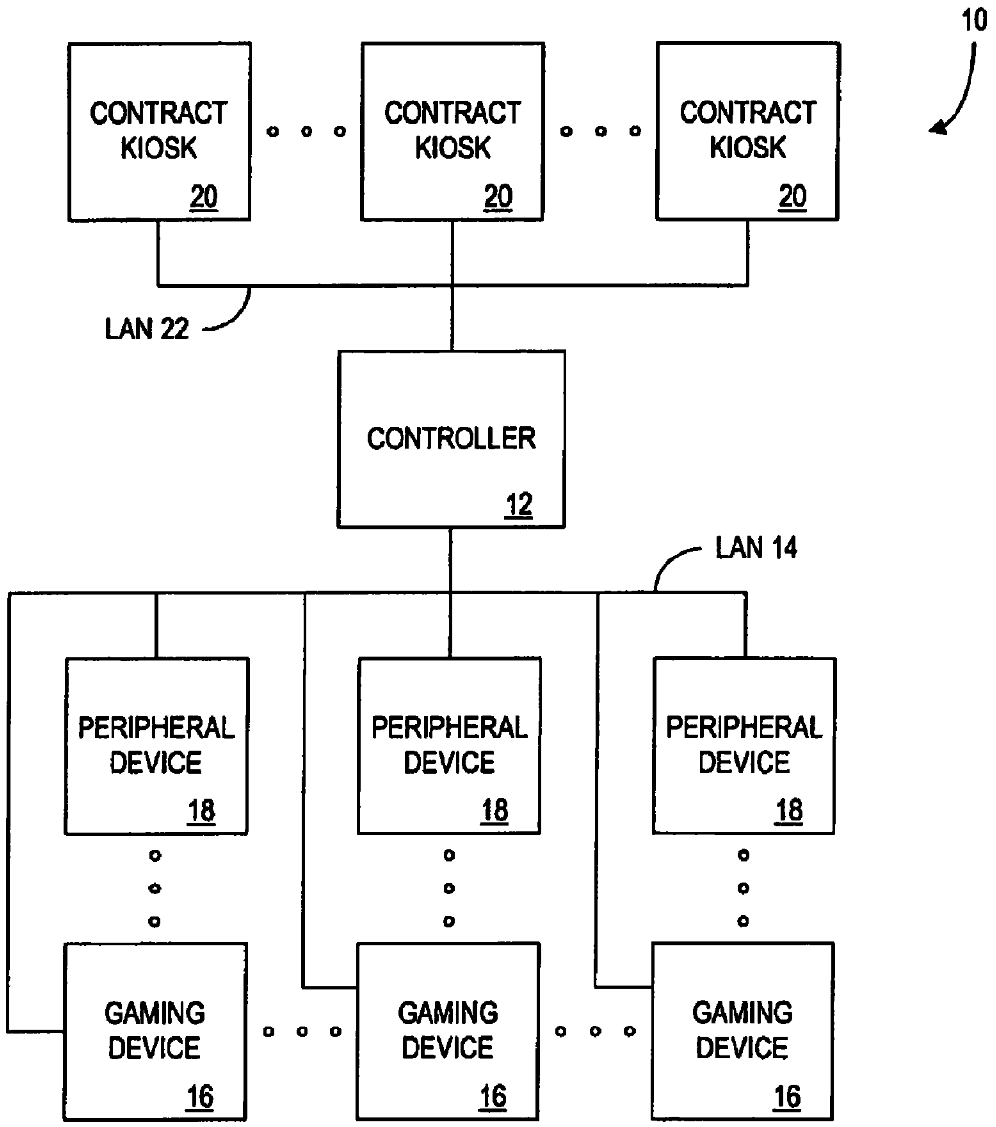
FIG. 1 illustrates a system overview according to some embodiments of the present invention.

Embodiments of the present invention may be configured to work in a network environment 10 as illustrated in FIG. 1. In particular, a casino server or controller 12 is in communication, via a communications network, such as a local area network (LAN) 14, with one or more devices, such as gaming devices 16. The LAN 14 may also connect the controller 12 to peripheral devices 18 such as card readers and the like. The controller 12 may be connected to contract kiosks 20 via another communications network, such as LAN 22. Note that LAN 14 and LAN 22 may be a single local area network (not shown) or distinct (shown). Other devices such as casino personnel devices, merchant point-of-sale (POS) terminals, component devices (e.g., display screens), and the like may also be connected to either LAN 14 or LAN 22 as needed or desired.

Communication on the LANs 14, 22 may be encrypted to ensure privacy and prevent fraud in any of a variety of ways well known in the art. The controller 12 and each of the devices 16, 18, 20 may comprise computers, such as those based on the Intel® Pentium® processor.

In an alternate embodiment, the controller 12 may not be necessary. For example, the present invention may, in one or more embodiments, be practiced on a stand-alone gaming device 16 and/or a gaming device 16 in communication only with one or more other gaming devices 16. In such an embodiment, any functions described as performed by the controller 12, or data described as stored on the controller 12 may instead be performed by or stored on one or more gaming devices 16. Likewise, attributes and databases ascribed to a gaming device 16 may instead be implemented on the controller 12 as needed or desired.

Figure 2:
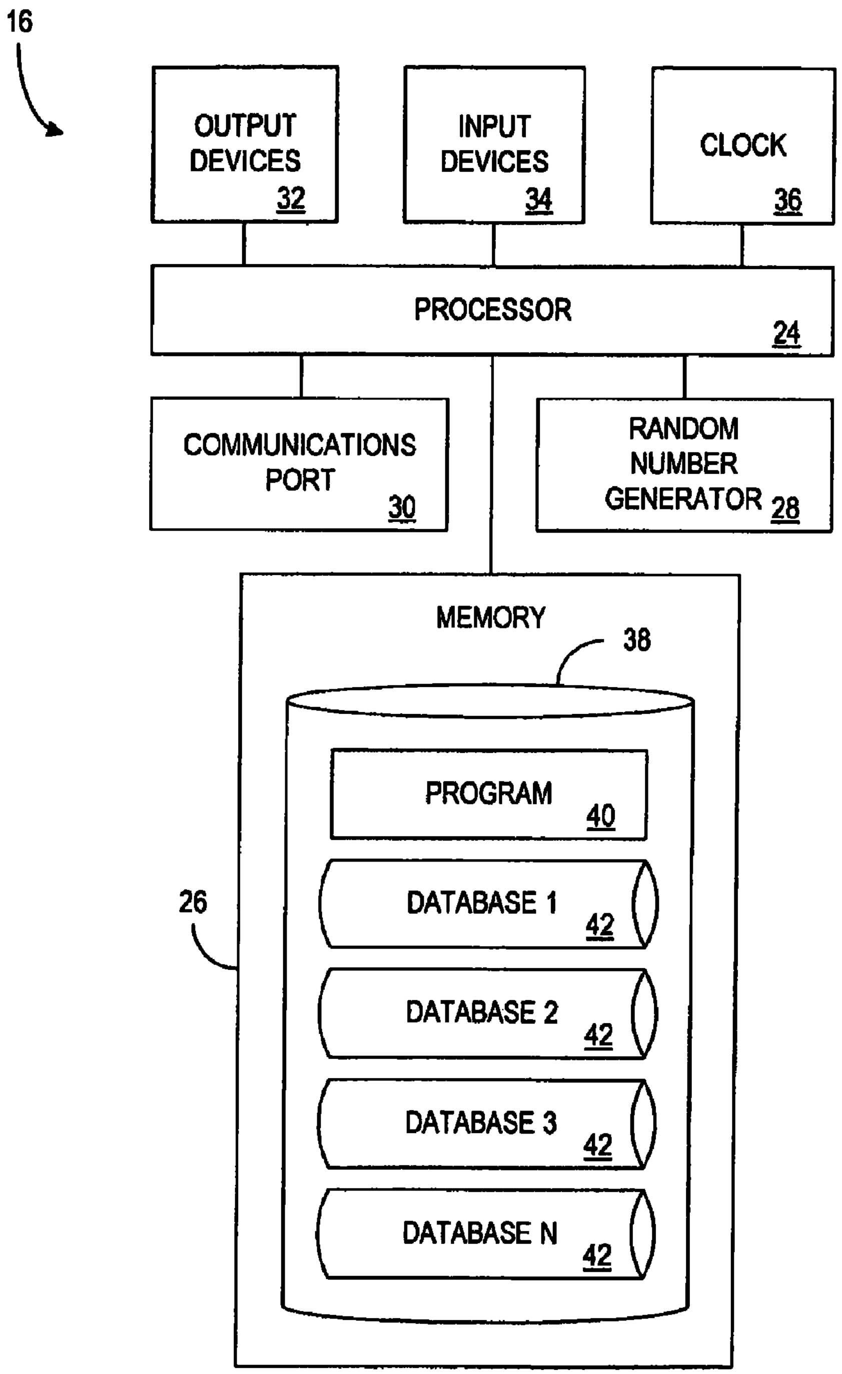
FIG. 2 illustrates an example gaming device according to some embodiments of the present invention.
Figure 11A:
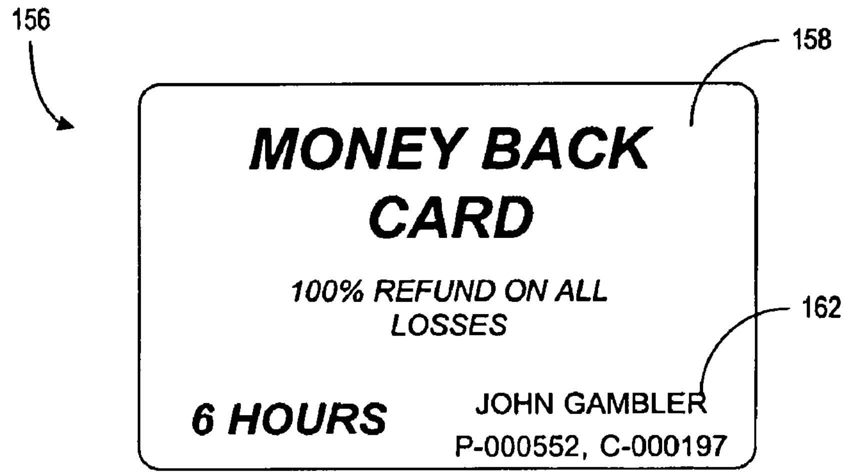
FIGS. 11A-11D illustrate a contract card according to some embodiments of the present invention.
Figure 11B:
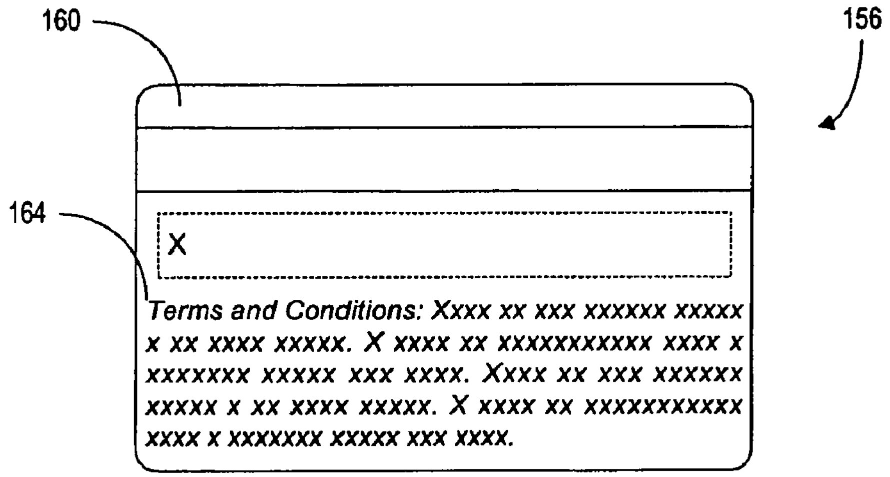
Figure 11C:
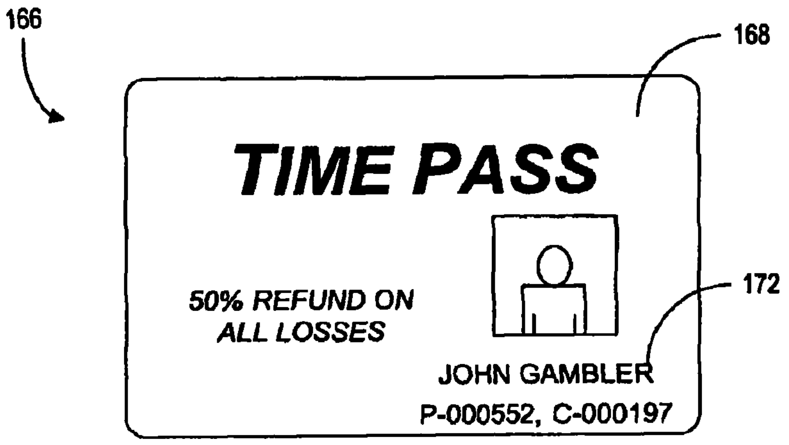
Figure 11D:
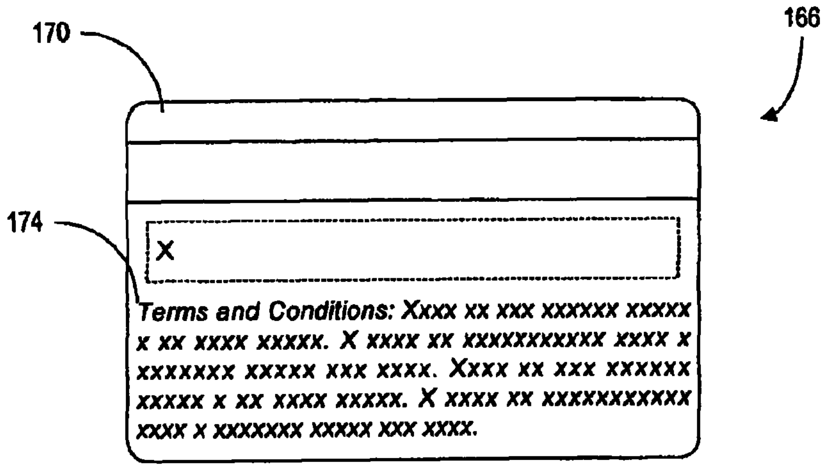

In an exemplary embodiment, each gaming device 16 is a slot machine as illustrated in FIG. 2, although as explained herein, other devices are also contemplated. Each gaming device 16 may comprise a processor 24 coupled with a memory 26. The processor 24 also is operatively coupled to a random number generator (RNG) 28, a communication port 30, output devices 32, input devices 34, and an optional clock 36. Programs 40 and databases 42 (generally software 38) may be stored in memory 26. Output devices 28, input devices 30, RNG 28, and the optional clock 36 may be components of the gaming device 16 or separate entities as needed or desired. The processor 24 may communicate with the elements of the gaming device 16 using an internal bus or other communication medium in any appropriate protocol.

RNG 28, in accordance with at least one embodiment of the present invention, may generate data representing random or pseudo-random values (referred to as "random numbers" herein). RNG 28 may generate a random number, for example, every predetermined unit of time (e.g., every thousandth of a second) or in response to an initiation of a game on the gaming device 16. In the former embodiment, the generated random numbers may be used as they are generated (e.g., the random number generated at substantially the time of game initiation is used for that game) and/or stored for future use. A random number generated by the RNG 28 may be used by the processor 24 to determine, for example, at least one of an outcome and payout. RNG 28, as used herein, may be embodied as a processor separate from, but working in cooperation with the processor. Alternatively, RNG 28 may be embodied as an algorithm, program component, or software stored in the memory 26 with the software 38.

Note that, although the generation or obtainment of a random number is described herein as involving a RNG 28 of a gaming device 16, other methods of determining a random number may be employed. For example, in some embodiments, a gaming device may receive random numbers and/or any other data related to the random or pseudo-random determination of an outcome from a separate device, such as a server. It should be noted that such embodiments may be advantageous in environments or jurisdictions wherein the "central determination" of outcomes is required by regulation or otherwise preferred. In other embodiments, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The gaming device 16 is operatively connected to the LAN 14 (FIG. 1) through the communication port 30. As noted elsewhere, any appropriate protocol and transmission medium are acceptable.

Output devices 32 may include a benefit output device (not shown explicitly). In some embodiments, a benefit output device may be a component of gaming device 16 and output a benefit to a player of the gaming device 16. For example, in one embodiment the gaming device 16 may provide coins and/or tokens as a benefit. In such an embodiment the benefit output device may comprise a hopper and hopper controller, for dispensing coins and/or tokens into a coin tray of the gaming device 16. In another example, the gaming device 16 may provide a receipt or other document on which there is printed an indication of one or more benefits (e.g., a cashless gaming ticket as is known in the art). In such an embodiment, the benefit output device may comprise a printing and document dispensing mechanism. In yet another example, the gaming device 16 may provide electronic credits as a benefit (which, e.g., may be subsequently converted to coins and/or tokens and dispensed from a hopper into a coin tray). In such an embodiment, the benefit output device may comprise a credit meter balance and/or a processor that manages the amount of electronic credits that is indicated on a display of a credit meter balance. In yet another example, the gaming device 16 may credit a monetary amount to a financial account associated with a player as a benefit provided to a player. The financial account may be, for example, a credit card account, a debit account, a charge account, a checking account, or a casino account (e.g., an account from which the player may access cashable and/or non-cashable funds using a player tracking card or smart card). In such an embodiment the benefit output device may comprise a device for communicating with a server on which the account is maintained. Note that, in one or more embodiments, the gaming device 16 may include more than one benefit output device. For example, the gaming device 16 may include both a hopper and hopper controller combination and a credit meter balance. Such a gaming device 16 may be operable to provide more than one type of benefit to a player of the gaming device 16. A single benefit output device may be operable to output more than one type of benefit. For example, a benefit output device may be operable to increase the balance of credits in a credit meter and communicate with a remote device in order to increase the balance of a financial account associated with a player.

Output devices 32 may include other forms of output devices such as a display (not shown explicitly). The display may comprise, for example, one or more display screens or areas for outputting information related to game play on the gaming device, such as a cathode ray tube (CRT) monitor, liquid crystal display (LCD) screen, or light emitting diode (LED) screen. In one or more embodiments, a gaming device 16 may comprise more than one display device or display areas. For example, one of the display areas (e.g., a primary game screen) may display outcomes of games played on the gaming device 16 (e.g., electronic reels of a gaming device). Another of the display areas (e.g., a secondary game screen) may display rules for playing a game of the gaming device 16. Yet another of the display areas may display the benefits obtainable by playing a game of the gaming device 16 (e.g., in the form of a payout table).

Other output devices 32 may comprise, for example, an audio speaker (e.g., for outputting an outcome or information related thereto, in addition to or in lieu of such information being output via a display device); headphones; an infra-red transmitter; a radio transmitter; an electric motor; a printer (e.g., such as for printing cashless gaming tickets); a dispenser for outputting pre-printed coupons, tickets or vouchers; an infra-red port (e.g., for communicating with a second gaming device or a portable device of a player); one or more universal serial bus (USB) ports; a Braille computer monitor; and a coin or bill dispenser as is well understood in the gaming industry.

Input devices 34 are capable of receiving an input (e.g., from a player or another device). An input device 34 may communicate with or be part of another device (e.g., a server, a gaming device 16, etc.). Some examples of input devices 34 include: a bar-code scanner, an optical scanner configured to read other indicia of a voucher or cashless gaming ticket, a CCD camera, a magnetic stripe reader (e.g., for reading data encoded upon a player tracking card), a smart card reader (e.g., for reading data stored upon a smart card), a computer keyboard or keypad, a button, a handle, a lever, a keypad, a touch-screen, a microphone, an infrared sensor, a voice recognition module, a payment system, a coin or bill acceptor, a sonic ranger, a computer port, a video camera, a motion detector, a digital camera, a network card, a USB port, a GPS receiver, a radio frequency identification (RFID) receiver, an RF receiver, a thermometer, a pressure sensor, an infrared port (e.g., for receiving communications from a second gaming device or from a another device such as a smart card or PDA of a player), and a weight scale. For an exemplary gaming device 16, input devices 34 include a button or touch screen on a video poker machine, a lever or handle connected to the gaming device, a magnetic stripe reader to read a player tracking card inserted into a gaming device, a touch screen for input of player selections during game play, and a coin and bill acceptor.

In some embodiments, a gaming device 16 may comprise components capable of facilitating both input and output functions (i.e., input/output devices). In one example, a touch-sensitive display screen comprises an input/output device (e.g., the device outputs graphics and receives selections from players). Another example is a "ticket-in/ticket-out" device configured to dispense and receive cashless gaming tickets as is known in the art. Such a device may also assist in (e.g., provide data so as to facilitate) various accounting functions (e.g., ticket validation and redemption). One example of such ticket-in/ticket-out technology is the EZ Pay™ system, which is manufactured by International Gaming Technology, headquartered in Reno, Nev.

The memory 26 stores software 38 including programs 40 for controlling the processor 24. The processor 24 performs instructions of the program 40, and thereby operates in accordance with embodiments of the present invention. The program 40 may be stored in a compressed, uncompiled and/or encrypted format. The program 40 furthermore includes program elements that may be necessary, such as an operating system, a database management system and "device drivers" for allowing the processor to interface with computer peripheral devices. Appropriate program elements are known to those skilled in the art, and need not be described in detail herein. The program 40 may operate in any manner appropriate to control the processor 24 as needed or desired.

According to an embodiment of the present invention, the instructions of the program 40 may be read into a main memory from another computer-readable medium, such from a ROM. Execution of sequences of the instructions in program causes processor perform the process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to aforementioned systems, execution of sequences of the instructions in a program 40 of a peripheral device in communication with the gaming device may also cause the processor to perform some of the process steps described herein.

The software 38 may store one or more databases 42. The described entries of the databases 42 represent exemplary information only; those skilled in the art will understand that the number and content of the entries can be different from those illustrated herein. Further, despite any description of the databases 42 as tables, an object-based model could be used to store and manipulate the data types of the present invention and likewise, object methods or behaviors can be used to implement the processes of the present invention.

Where appropriate, a prior art probability database (not shown) may be utilized in the performance of the inventive processes described herein. A probability database may be stored in the memory 26 in tabular form, or any other appropriate database form, as is well known in the art. The data stored therein may include a number of exemplary records or entries, each defining a random number. Those skilled in the art will understand that the probability database may include any number of entries. The tabular representation may also define fields for each of the entries or records. The fields may specify: (i) a random number (or range of random numbers) that may be generated by the random number generator; and (ii) an outcome that indicates the one or more indicia comprising the outcome that corresponds to the random number of a particular record. A gaming device 16 may utilize a probability database to determine, for example, what outcome corresponds to a random number generated by the RNG 28 and to display the determined outcome. The outcomes may comprise the three symbols to be displayed along the payline of a three-reel slot machine. Other arrangements of probability databases are possible. For example, the book "Winning At Slot Machines" by Jim Regan (Carol Publishing Group Edition, 1997) illustrates examples of payout and probability tables and how they may be derived. The entirety of this book is incorporated by reference herein for all purposes.

Further, where appropriate, a prior art payout database (not shown) may be utilized in the performance of the inventive processes described herein. A payout database may be stored in the data storage device in tabular form, or any other appropriate database form, as is well known in the art. The data stored therein includes a number of example records or entries, each defining an outcome that may be obtained on a gaming device 16 that corresponds to a payout. Those skilled in the art will understand that the payout database may include any number of entries. The tabular representation also defines fields for each of the entries or records. The fields specify: (i) an outcome, which indicates the one or more indicia comprising a given outcome; and (ii) a payout that corresponds to each respective outcome. The outcomes may be those obtained on a three-reel slot machine.

A gaming device 16 may utilize the payout database to determine whether a payout should be output to a player as a result of an outcome obtained for a game. For example, after determining the outcome to output on the gaming device, the gaming device may access the payout database to determine whether the outcome for output is one of the outcomes stored as corresponding to a payout. If it is, the gaming device 16 may provide the corresponding payout to the player.

Other arrangements of payout databases are possible. For example, the book "Winning At Slot Machines" by Jim Regan (Carol Publishing Group Edition, 1997) illustrates many examples of payout and probability tables and how they may be derived.

Additionally, where appropriate, a player database 42A (see FIGS. 3A & 3B) may be utilized to store historical data associated with specific players. A player database 42A may be used, for example, to store player wager data so that players wagering over a given threshold in a given amount of time may be rewarded for their patronage. The player database 42A may also contain other information that may be useful in, for example, promoting and managing player behaviors (e.g., information about the player's gaming preferences, gaming sessions, outstanding debts, lodging arrangements, and the like). Further, the player database 42A may store data regarding a given player's standing in a game session or bonus game, so that the player can continue the game session or bonus game at a plurality of game machines 16 that have common access to the player database 42A. Such player data may be stored in a relational database and retrieved or otherwise accessed by the processor after receiving a "key" data point from the player, such as a unique identifier read from the player's player tracking card or cashless gaming ticket.

Note that, although these databases may be described as being stored in a gaming device 16, in other embodiments of the present invention some or all of these databases may be partially or wholly stored in another device, such as one or more of the peripheral devices 18, a peripheral device server (not shown), a controller 12 or the like. Further, some or all of the data described as being stored in the databases 42 may be partially or wholly stored (in addition to or in lieu of being stored in the memory of the gaming device) in a memory of one or more other devices, such as one or more of the peripheral devices 18, a kiosk 20, another gaming device 16, and/or the controller 12.

As described, in some embodiments, a gaming device 16 may comprise a reader device for reading data from player tracking cards, contract cards and/or smart cards, such that (i) players and/or gaming contracts may be identified, and (ii) various data associated with players may then be determined (e.g., a number of cashable credits; a number of promotional credits that may not be redeemed for cash; a number of accumulated loyalty points; a number of accumulated game elements such as symbols, cards or hands; various parameters of a gaming contract; etc.). In one example, a card reader device may determine an identifier associated with a player (e.g., by reading a player tracking card comprising an encoded version of the identifier), such that the gaming device 16 may then access data (e.g., of a player database 42A, as described) associated with the player. In another example, a smart card reader device may determine data associated with a player directly by accessing a memory of an inserted smart card.

Further, as known in the art, a gaming device 16 may comprise a player tracking module comprising (i) a card reader (e.g., a port into which player-tracking and/or contract cards may be inserted), (ii) various input devices (e.g., a keypad, a touch-screen), (iii) various output devices (e.g., a small, full-color display screen), and/or (iv) combinations thereof (e.g., a touch-sensitive display screen that facilitates both input and output functions). Various commercially available devices may be suitable for such an application, such as the NextGen™ interactive player tracking panel manufactured by IGT or the iVIEW display screen manufactured by Bally® Gaming and Systems.

Of course, other non-card-based methods of identifying players and/or gaming contracts are contemplated. For example, a unique identification code may be associated with a player or contract. The player or contract may then be identified upon entering the code. For example, the code may be stored (e.g., within a database 42 maintained within the gaming device 16 and/or a database associated with the controller 12) such that a player may enter the code using an input device 34 of a gaming device 16, and accordingly be identified. In other embodiments, player biometrics may serve as identification means (e.g., a player is identified via a thumbprint or retinal scan). In further embodiments, a barcode of a cashless gaming ticket may encode a player identifier, contract identifier or other type of identifier.

Thus, as described, various data associated with a player and/or gaming contract may be tracked and stored (e.g., in an appropriate record of a centrally-maintained database), such that it may be accessed as desired (e.g., when determining promotional offers or rewards to be provided to players, when determining the status of player with respect to a particular game or period of gambling activity, and so on). Further, various statistics and other data may be monitored, tracked, measured, recorded, stored, and/or accessed in association with a player (e.g., coin-in statistics, win/loss statistics, game play data).

Various hardware/software/firmware configurations for facilitating such monitoring, tracking, measuring, recording, storing, and/or accessing are contemplated. For example, a two-wire system such as one offered by International Gaming Systems (IGT) may be used. Similarly, a protocol such as the IGT SAS™ protocol may be used. The SAS™ protocol allows for communication between gaming machines and slot accounting systems and provides a secure method of communicating all necessary data supplied by the gaming device to the online monitoring system. One aspect of the SAS™ protocol that may be beneficial in implementing aspects of the present invention is the authentication function which allows operators and regulators to remotely interrogate gaming devices for memory verification information, for both game programs, and peripheral devices. In another example, a one-wire system such as the OASIS™ System offered by Aristocrat Technologies™ or the SDS slot-floor monitoring system offered by Bally Gaming and Systems™ may be used. Each of the systems described above is an integrated information system that continually monitors slot machines and customer gaming activity. Thus, for example, any one of these systems may be used to monitor a player's gaming activity in order to determine player outcomes, coin-in statistics, win/loss statistics and/or any other data deemed relevant (e.g., game play data).

In some embodiments, a kiosk 20 may be configured to execute or assist in the execution of various processes of the present invention. In some embodiments, the kiosk 20 may comprise a processor and a memory as described with reference to the gaming device 16. The kiosk 20 may also comprise various input devices (e.g., a keypad, a keyboard, a mouse, buttons, a port that receives player tracking cards, an optical scanner for reading barcodes or other indicia, a CCD camera, etc.), output devices (e.g., a display screen, audio speakers, etc.), benefit output devices (e.g., a coin tray or printer for printing cashless gaming tickets), combinations thereof (e.g., a "ticket-in/ticket-out" device, a touch-sensitive display screen, etc.), communications ports, and so on. Thus, the kiosk 20 may comprise many of the features and components of a gaming device 16, though the kiosk 20 may not necessarily be configured to enable gambling activity as a primary function. The kiosk 20 may communicate with any or all of (i) a central controller 12, (ii) a gaming device 16, (iii) an inventory/reservation system of a casino-maintained property (e.g., a hotel), (iv) casino personnel devices, (v) merchant POS terminals, and so on. A number of kiosks 20 may be stationed within casino premises (e.g., at various locations on a slot floor). In various embodiments, kiosks 20 may execute or assist in the execution of (i) determining and outputting a player status or other types of data described herein (e.g., the kiosk 20 receives a contract card, and outputs a refund amount which a player may be entitled to redeem), (ii) outputting payments to players (e.g., upon receipt of cashless gaming tickets, contract cards, player tracking cards, smart cards, etc.), and/or (iii) any other process described herein. Thus, such a device may be configured to read from and/or write to one or more databases of the present invention. The memory of such a device may store a program for executing such processes.

In some embodiments, various casino employees may be equipped with or otherwise utilize one or more casino personnel devices (not shown explicitly), such as personal digital assistants (PDAs) or other computing devices (e.g., personal computer terminals). A casino personnel device may comprise various input devices (e.g., a keypad, a touch-sensitive display screen, a card reader, an infrared bar code scanner, etc.), various output devices (e.g., an LCD screen), a processor, a memory and/or a communications port, as described herein with respect to other devices. In some embodiments, a casino personnel device may communicate with a gaming device 16, controller 12, kiosk 20, peripheral device 18, and/or an inventory/reservation system of a casino-maintained property (e.g., a hotel). Thus, a casino personnel device may be configurable to, among other things, (i) read from and/or write to one or more databases of the present invention, (ii) assist in payments made to players (e.g., a representative "scans" a cashless gaming receipt and determines a value associated with the receipt, and if the receipt is valid, provides payment equal to the value), and/or (iii) execute or assist in the execution of various other processes described herein. The memory of such a device may store a program for executing such processes.

In some embodiments, various merchants (e.g., shops, restaurants, etc.) may utilize point-of-sale (POS) computer terminals (not shown explicitly) to facilitate various processes of the present invention. For example, in some embodiments, a player may receive a cashless gaming ticket redeemable for an amount of currency. However, the ticket may alternately or additionally be redeemable for an amount of credit at a particular merchant location. Thus, in some embodiments, merchants may utilize POS terminals to redeem such vouchers. In some embodiments, such devices may be configured to read from and/or write to one or more databases of the present invention. Such POS terminals may thus comprise various hardware and software described herein with respect to other devices, and may communicate with (i) a controller 12, (ii) a gaming device 16, (iii) an inventory/reservation system (e.g., a computer terminal at a theatre communicates with an inventory database to determine a number of unsold seats for a certain event), (iv) a kiosk 20, and so on.

In one or more embodiments, aspects of the present invention may be practiced by replacing and/or augmenting one or more components (e.g., hardware and/or software components) of an existing gaming device 16. Thus, in one or more embodiments, the invention may be applied as a retrofit or upgrade to existing gaming devices 16 currently available for play within various casinos.

For example, a "gaming contract module" may be made available for purchase to various casino operators. The module, which may comprise various hardware and software (e.g., an EEPROM storing software instructions), may be installed in an existing gaming device 16, such that when the module is installed, players of the device may elect (i) to play a game offered by the gaming device 16 that does not incorporate aspects of the present invention, or (ii) to play a game offered by the gaming device 16 in a manner that utilizes aspects of the present invention. Thus, players who are familiar with the games offered by various gaming devices may elect to pay for them in a different or similar manner as they are accustomed to.

Embodiments of the present invention allow players to purchase gaming contracts as that term is defined herein. In their simplest form, gaming contracts may be for a certain amount of guaranteed play. The amount of guaranteed play may be a set amount of time of play, a certain number of handle pulls, or the like as defined herein. More complicated contracts allow the player to purchase gambling insurance that refunds some or all of their losses during a gaming session in exchange for a premium. Embodiments of the present invention impact how these contracts are handled. Before a discussion of the nuances of the contracts of certain embodiments of the present invention is provided, a more general overview of contracts and their use is provided.

Returning to the player database 42A, FIGS. 3A & 3B illustrate an exemplary player database 42A, which may include fields such as player identifier 44, name 46, address 48, membership duration 50, wager totals 52, theoretical win values 54, active contracts 56, expired contracts 58, and a hotel guest status 60. Such player data may be collected and/or stored in a variety of manners. For example, a player may have previously registered for a player tracking card. Thus, various game play data (e.g., payout data, win/loss data, wager data, etc.) may have been tracked and stored in association with a player identifier and/or contract identifier. It should be noted that, in some embodiments, a player may not have previously registered for a player tracking card or registered as a casino hotel guest. Accordingly, a player database 42A may contain no data stored with reference to the player (e.g., a casino representative uses a computer of the present invention to search for the player's name, but no record is revealed).

When the data is present, the player identifier field 44 may include a unique alphanumeric identifier for each player and may correspond to the player number associated with a player tracking card. The name field 46 may include a name given by the player when signing up for a player tracking card and thus may include a nickname, a full name, or the like as needed or desired. The address field 48 may include a home address or business address as provided by the player when signing up for the player tracking card. The membership duration field 50 may include a date from which the player has been a member of the player rewards program and may reflect the date the player applied for the player rewards program, the date the application was granted, or other date as appropriate. The wager totals field 52 may include a cumulative amount of wagers made in conjunction with the player tracking card. The theoretical win value field 54 corresponds to what the casino expects to earn from the player on average. The active contracts field 56 lists any contracts that are currently active for the player. The expired contracts field 58 lists any contracts that have been completed between the tracking entity and the player. The hotel guest status field 60 is a flag that indicates whether the player is a guest at the hotel or casino. Some or all of the information in some or all of these fields may be used to determine whether a player is eligible for a contract and/or what sort of premium the contract will entail as explained in more detail with reference to FIG. 4.

A gaming contract may be provided in a variety of manners. In some embodiments, a player may indicate a desire to activate, purchase or otherwise agree to a gaming contract. In one or more embodiments, a player may approach a casino representative in the interest of activating a gaming contract. For example, in one embodiment, a booth or other location within casino premises may be dedicated to administering contracts, and staffed with personnel and casino personnel devices accordingly (e.g., a desk behind which staff operate computer terminals, such that requests to provide contracts may be received). In another embodiment, a player may approach a "mobile" casino representative (e.g., a casino "floor representative" may be given a PDA or other handheld computing device, which may communicate with any of the devices/computers described herein such that a request to provide a contract may be received). In other embodiments, a player may approach a kiosk 20 dedicated to contracts, in effect, a "contract kiosk", and indicate an interest to activate a gaming contract (e.g., by actuating an input device of the kiosk 20, such as a graphic of a touch-sensitive display screen that reads "Press here to get your losses covered!"). In further embodiments, a player may request to receive a gaming contract by dialing a particular phone number and accessing an IVRU (e.g., a tent-card advertisement placed on top of a slot machine reads, "Dial 1-888-CONTRACT" and get 50% of your gambling losses covered—FREE!", such that the player dials the phone number, listens to a menu of options, and selects an option to purchase a gaming contract by pressing an appropriate button of a cellular phone keypad). In an alternate embodiment, a player may indicate a desire to activate a contract by actuating an input device of a gaming device 16. In this manner, a request to provide a gaming contract may be received by a system in a variety of manners.

In some embodiments, the step of providing a gaming contract may first comprise reviewing player data to determine player eligibility. For example, in one embodiment, only players characterized by certain data may receive a gaming contract (e.g., only registered hotel guests). Further, in some embodiments, players characterized by certain player data may receive only certain contract parameters (e.g., "high rollers" may be eligible to receive a higher percentage refund of gambling losses, longer contract periods, and so on).

Accordingly, in some embodiments, the player database 42A may be accessed in accordance with a particular player identifier or player name (e.g., a casino representative keys-in a player name, swipes a player tracking card through a card-reader device in communication with a casino personnel device, etc.) so as to determine a player's eligibility for receiving a gaming contract and/or one or more particular contract parameters.

In some embodiments, a player having no record or account may not be permitted to receive a gaming contract. In one such embodiment, a player may be offered an opportunity to establish a player record or account. For example, the player may be presented with an opportunity sign up for a player tracking card (e.g., open a player account). In another example, a player may receive a "guest pass" in exchange for performing a particular task (e.g., filling out a survey, eating at a casino-maintained restaurant, etc.); such a guest pass may then permit the player to receive a gaming contract. In other embodiments, a player having no record may receive a contract characterized by only certain contract parameters.

A casino may then determine eligibility to receive a gaming contract and/or one or more particular contract parameters based on the player data. For example, turning to an exemplary data structure of a player eligibility database as depicted by FIG. 4, a player eligibility database 42B may contain a number of fields relating to rules for contract provision, including rule identifier field 62, rule prerequisite field 64, rule ramification field 66, and a rule status flag field 68.

The rule identifier field 62 has the identifier for each rule (e.g., R-001-R-00N). Each rule has its own unique identifier, which may be an alphanumeric string, or the like as needed or desired. The rule prerequisite field 64 is for storing prerequisites that may restrict or enable a player from receiving a gaming contract and other related parameters associated with the contract. In essence, this field stores the "if" part of an "if . . . then . . . " statement. Likewise, the rule ramification field 66 has the impact of meeting the prerequisite. The rule ramification field 66 stores the "then" part of an "if . . . then . . . " statement. For example, as illustrated, if the identified player already has an active contract, then rule R-002 states that the player is not eligible for another contract.

In some embodiments, rules may be enabled or disabled as a casino operator sees fit (e.g., a "rule status" field of a player eligibility database is programmed to reflect which rules the casino desires to enable). The enabled or disabled status is stored in rule status flag field 68. Accordingly, a system may be configured to determine whether a player is eligible to receive a gaming contract and/or one or more particular contract parameters.

Additionally, in some embodiments, the casino may evaluate whether a particular gaming device 16 is eligible for contract play. Such an eligibility determination is made with reference to a gaming device database 42C as illustrated in FIGS. 5A & 5B. In some embodiments, it may be beneficial to restrict certain gaming devices 16 or gaming device types characterized by certain attributes from a gaming contract (e.g., such that a player receiving a gaming contract may not receive a refund of any losses incurred as a result of one or more game plays of the device). Accordingly, various attributes may be considered when determining eligibility associated with a particular gaming device 16.

The gaming device database 42C may include fields such as a device type identifier 70, a device name 72, a manufacturer 74, a location 76, a game type 78, a standard deviation 80, a payout percentage 82, a top jackpot 84, and a wager denomination 86. The device type identifier field 70 lists a unique identifier for each device. The device name field 72 lists a common name for the machine. The manufacturer field 74 lists the manufacturer of the machine. The location field 76 lists where the machine can be found in the casino or gaming establishment. The game type field 78 lists what type of game is played on the machine. The standard deviation field 80 lists a statistical value for the breadth of payouts associated with the gaming device 16. Standard deviations may be calculated through normal statistical methods. The payout percentage field 82 lists what the expected payout is for each gaming device 16. Alternatively this may be a house edge or hold field from which the same information may effectively be derived. The top jackpots field 84 may list the highest payout or benefit available at each gaming device 16. This value may be expressed in credits, cash value, or other currency as needed or desired. The wager denomination field 86 lists the normal wager associated with each gaming device 16.

In one or more embodiments, a gaming device 16 may be restricted from contract play if a standard deviation metric associated with the gaming device 16 is too high. In other embodiments, a gaming device may be restricted if it is characterized by a relatively high payback percentage. In further embodiments, a variety of other attributes listed in the gaming device database 42C may be considered when determining gaming device eligibility. Other conditions, such as the conditions under which the casino purchased or leased the device (e.g., a "participation" machine for which casinos must pay a copyright holder a percentage of the machine's win may not be eligible) or the time of day may also be considered if needed or desired.

Thus, a gaming device eligibility database 42D, an example data structure of which is depicted by FIG. 6, may be used to determine whether or not a gaming device 16 is eligible for contract play based on the gaming device data. The gaming device eligibility database 42D may include fields such as eligibility rule identifier 88, prerequisite rule 90, ramification rule 92, and rule status 94. The eligibility rule identifier field 88 lists a unique identifier for each eligibility rule. The prerequisite rule field 90 lists prerequisites that may restrict or enable the gaming device from being part of contract play and other related parameters associated with the contract. In essence, this field stores the "if" part of an "if . . . then . . . " statement. Likewise, the ramification rule field 92 lists the impact of meeting the prerequisite. The rule ramification field 92 stores the "then" part of an "if . . . then . . . " statement. The rule status field 94 lists whether a particular rule is enabled or disabled.

In practice, in one embodiment, any gaming device 16 characterized by a "progressive" jackpot as indicated by a gaming device type database 42C may not be eligible for contract play (i.e., rule R-001). In another embodiment, if a gaming device type database 42C indicates that a standard deviation metric associated with a gaming device is greater than a predetermined threshold amount (e.g., "6") the gaming device 16 may not be eligible for contract play. In yet another example, a gaming device 16 manufactured by a certain company may not be eligible (e.g., rule R-00N). As stated, in some embodiments, rules may be enabled or disabled as a casino operator sees fit.

Further, in some embodiments, a casino may determine a level of gaming device utilization before granting a contract. For example, in one embodiment, a gaming contract may only be provided if it is determined that there is sufficient capacity for contract play (e.g., enough slot machines located on the floor of a casino are not currently being utilized, such that adding another player to the floor for the duration of a particular contract period will not result in a shortfall of gaming device capacity that is deemed unacceptable by a casino). In one embodiment, gaming device utilization data may be stored in a utilization database (not shown). For example, a utilization database may indicate a "device status" associated with a gaming device 16. The device status may describe whether the particular device is currently "in use" or "not in use." A variety of methods of monitoring gaming devices 16 to detect such utilization are contemplated (e.g., detecting game play activity, detecting the insertion of a player tracking card or contract card, detecting the presence of a player using a sensor device, monitoring gaming devices with video cameras, etc.), such that in some embodiments, the controller 12 may track gaming device 16 utilization in a substantially automatic manner (e.g., the controller 12 detects use and writes to a centrally-stored utilization database). In one embodiment, a percentage utilization metric may then be calculated with respect to all gaming devices 16 within a casino (e.g., 37% of all machines are in use). Accordingly, in some embodiments, a gaming contract may or may not be provided depending on a determined percentage utilization metric (e.g., if a percentage utilization metric is above a certain threshold, no gaming contracts are to be provided). In a further embodiment, historic gaming device utilization data may be considered when determining whether or not a gaming contract is to be provided (e.g., on average, slot machine utilization from 12 p.m. until 6 p.m. on Wednesdays has been 23% at Casino A).

In some embodiments, once (i) a request to establish a gaming contract has been received from a player, (ii) the player's eligibility has been determined, (iii) eligible/ineligible gaming device types have been identified, and/or (iv) gaming device utilization has been determined, one or more contract parameters may be determined in association with a gaming contract before the contract is provided. Contract parameters are myriad and include parameters such as contract period, refund rate, contract fee, play requirements, and the like and are discussed in greater detail with reference to FIGS. 8A & 8B.

It should be noted that, in some embodiments, a gaming contract characterized by certain predetermined combinations of contract parameters might not be provided to any player. A gaming contract rules database 42E, illustrated in FIG. 7 is used to illustrate this point. Gaming contract rules database 42E may include a contract rule identifier field 96, an associated parameters field 98, a ramification field 100, and a rule status field 102. The contract rule identifier field 96 lists a unique identifier for each gaming contract rule. This identifier may be alphanumeric string or the like as needed or desired. The associated parameters field 98 lists parameters having an impact on each of the rules. The ramification field 100 lists whether a contract can be provided if the parameters identified in associated parameters field 98 are satisfied. The rule status field 102 lists whether a given gaming contract rule is enabled or disabled. For example, as illustrated in FIG. 7, rule R-001 states that no player may receive a gaming contract wherein the associated contract parameters comprise a refund rate of greater than 75%, with a contract fee of less than $10 and a contract period of shorter than one hour. In another example, no player may receive a gaming contract wherein an associated contract parameter comprises a minimum rate of play requirement of fewer than 300 game plays per hour. In yet another example, no player may receive a gaming contract wherein an associated contract parameter comprises a refund rate of greater than 100%. It should be noted that, in some embodiments, such rules might have the effect of establishing the boundaries of gaming contracts, such that gaming contracts with a low likelihood of generating profit for a casino may not be provided.

Turning to FIGS. 8A & 8B, a contract database 42F is illustrated. The contract database 42F may store information about all contracts currently active for an establishment. The contract database may include fields covering contract identifiers 104, player identifiers 106, contract period 108, refund rate 110, contract fee 112, play requirements 114, period remaining 116, total wager 118, total payout 120, and total loss 122. Other fields may be used if needed or desired.

The contract identifier field 104 lists a unique identifier for each contract. This identifier may be an alphanumeric string and may, for the numeric part, be monotonically increasing in value, although such is not strictly required. The player identifier field 106 lists the player identifier of the player with whom the contract has been made. The player identifier may correspond to the player identifier in player identifier field 44 of FIGS. 3A & 3B or could be unique to the contract database 42F.

The contract period field 108 lists the duration of the contract. In some embodiments, a contract period may comprise (i) a predetermined number of game plays, (ii) an indeterminate number of game plays to be initiated within a predetermined period of time (e.g., one hour), or other measurable value. Thus, in one example, a contract period comprises 5,000 handle pulls of a slot machine (e.g., a player agrees to receive a 50% refund on all losses incurred at any eligible slot machine, so long as the player initiates 5,000 game plays in total). In another example, a contract period comprises six hours (e.g., a player agrees to receive a 75% refund on all losses incurred during six hours of gaming device play). In a further example, a contract period may comprise a specific period of hours during one or more days (e.g., contract play comprises any game plays initiated between 8 a.m. and 1 p.m. on a particular day).

The refund rate field 110 lists an effective refund percentage based on the insurance that the contract provides. In some embodiments, a refund amount, which may be based on a determined loss amount, may be provided to a player at the conclusion of a gaming contract. Accordingly, a refund rate associated with a gaming contract may specify a refund amount payable to a player based on a determined loss amount. For example, a refund rate associated with a gaming contract may be a percentage of a determined loss amount (e.g., if a refund rate is 50% and a player loses $160 during contract play, a determined refund amount is $80). In some embodiments, a refund rate may be 100% of a player's determined loss amount (e.g., the entirety of a player's gambling losses during a contract period are reimbursed). In an alternate embodiment, a flat payout amount may be specified in lieu of a refund (e.g., if a player agrees to play 12 hours of slots, the player receives a $50 bonus payment at the conclusion of the contract). In another alternate embodiment, a player may receive no refund. In yet another embodiment, a refund rate may be greater than 100% (e.g., "We'll refund all your losses plus pay you 5%!"). In yet another embodiment, a gaming contract may entitle a player to receive a payment based on a win amount (e.g., "Get double your winnings!").

The contract fee field 112 lists how much the contract is costing the player. In various embodiments, a gaming contract may be provided only if a player (i) pays or agrees to pay a premium, fee or surcharge, which may be associated with one or more game plays and/or wager amounts, and/or (ii) agrees to a predetermined contract period.

Accordingly, in one example, a contract fee may comprise a flat fee associated with the gaming contract (e.g., a player agrees to pay $30 in exchange for the activation of a gaming contract). In another example, a player may agree to pay an incremental fee, which may be based on (i) one or more game plays initiated during contract play (e.g., a player agrees to pay a fee of 5¢ for each hand of video poker played during the contract period), and/or (ii) one or more wager amounts provided during contract play (e.g., a player agrees to pay 1¢ for every 25¢ wagered during the contract period). Such fees may be paid (i) before a gaming contract is provided (e.g., a player pre-pays a flat $30 contract fee), (ii) during a contract period (e.g., a player establishes a debit account with a casino, such that the debit account is deducted by an incremental fee amount in accordance with each game play) and/or (iii) after a contract period concludes (e.g., a player provides a credit card before a gaming contract is activated, but the card is not charged until contract play concludes and the contract is reconciled).

As stated, in some embodiments, a player may agree to a predetermined contract period in lieu of or in addition to a contract fee. For example, a player may agree to 12 hours of slot machine play in exchange for a gaming contract offering a 100% refund of all losses at a premium of 1¢ per every 25¢ wagered. In another example, a player may agree to six hours of slot play in exchange for a gaming contract offering a 50% refund of all losses with no associated contract fee.

The play requirement field 114 lists any restrictions on the play associated with the contract. In some embodiments, a contract parameter may comprise a play restriction, which may then be considered when determining a compliance status associated with a player and/or a gaming contract. A variety of play restrictions are contemplated.

In some embodiments, a play restriction may specify one or more gaming devices 16 and/or types of gaming devices 16 which may be eligible or ineligible for contract play. In one example, only a specific type of gaming device 16 may be played (e.g., "Big Poker Poker"). In another example, one or more eligible or ineligible gaming devices 16 may be indicated by a gaming device identifier or other code (gaming contract "C-0000N1" may permit play on any gaming device 16 within a particular range of gaming device identifiers (e.g., "GD-000101-GD-000599")). In yet another example, eligible or ineligible gaming devices 16 may be indicated in another manner, such as by geographic location (e.g., all devices in a particular room are eligible).

In some embodiments, a play restriction may specify that contract play may only occur during certain hours and/or days. For example, an "early bird" contract may only allow a player's losses to be covered between the hours of 5 and 8 a.m. In another example, contract play may only occur during weekdays.

In some embodiments, a play restriction may specify that a player must maintain a predefined rate of play. For example, a player may receive a 50% refund on any losses incurred during a six-hour contract period, so long as the player agrees to maintain a minimum rate of three game plays per minute. Methods and apparatus for determining a gaming device player's rate of play and providing a benefit based at least thereon are described in U.S. Pat. No. 6,238,288, entitled "METHOD AND APPARATUS FOR DIRECTING A GAME IN ACCORDANCE WITH SPEED OF PLAY," filed Dec. 31, 1997, the entirety of which is incorporated herein by reference for all purposes.

In some embodiments, a play restriction may specify that a player must provide a contract fee in association with one or more game plays in order for the one or more game plays to qualify for contract play. For example, a player must provide an incremental contract fee of 1¢ per game play for every 25¢ wagered.

In some embodiments, a play restriction may specify a particular wager amount per game play, minimum wager amount per game play, maximum wager amount per game play and/or average wager amount per game play. For example, a play restriction may require a player to wager at least 25¢ per game play of a slot machine. In another example, a play restriction may require a player to wager a maximum of 75¢ per game play of a slot machine. In a further example, a play restriction may specify a number of slot machine paylines or number of hands of video poker which a player must activate in accordance with each game play, thereby implicating at least a minimum wager amount (e.g., as at least one coin must be wagered per "active" payline). For example, a play restriction may indicate that a player must activate a maximum of three slot machine paylines in accordance with each game play initiated during contract play.

The period remaining field 116 lists how much longer the contract has until expiration. This value may be based on the nature of the period and expressed in the same increments, whether time, plays, or the like.

The total wager field 118 lists how much the player has wagered. The total payout field 120 lists how much the player has received from her gambling. The total loss field 122 lists how much the player has lost and may be calculated from the total wager minus the total payout. The wager, payout, and loss fields may dictate the refund based on the refund rate as previously explained.

In addition to contract database 42F (or in place thereof if needed or desired), a contract requirement database 42G may be used. Contract requirement database 42G is illustrated in FIG. 9 and includes a contract identifier field 124, an eligible gaming device field 126, a time field 128, a day field 130, a rate of play field 132, a contract fee field 134, a wager minimum field 136, and a wager maximum field 138.

The contract identifier field 124 lists a unique identifier for each contract in the database 42G and is similar to the contract identifier field 104 of contract database 42F. The eligible gaming device field 126 lists what gaming devices 16 (if any) are eligible for coverage under the contract. For example, gaming contract "C-000001" may permit play on any gaming device 16 within a particular range of gaming device identifiers (e.g., "GD-000101-GD-000599"), though other means of indicating eligible gaming devices 16 are contemplated (e.g., geographically, by manufacturer, by type of device or game, by associated mathematical measurements such as standard deviation of payouts, etc.).

The time field 128 and day field 130 indicate what days and time of days are eligible for coverage under the contract. Thus, game plays of contract C-000001 may occur on any day and at any rate, but must occur between the hours of 3 and 6 p.m.

The rate of play field 132 lists how often the player must play to be covered by the contract. The contract fee field 134 lists the fee the player must pay to be covered by the contract. For example, for contract C-000001, the player must provide an additional 1¢ per every 25¢ wagered as a contract fee.

The wager minimum field 136 and the wager maximum field 138 list the minimum and maximum wagers covered by the contract respectively. For example, for contract C-000001, the player must wager at least 50¢ per game play, but may wager any higher amount possible on the eligible gaming devices 16.

In some embodiments, the present invention may comprise determining a number of contract parameters, such that the provision of an associated gaming contract may be profitable for a casino and only contracts having these parameters being offered to players. Thus, a casino may establish contract parameters in association with a number of "standard gaming contracts." A standard gaming contract may then be marketed as a product to prospective customers (e.g., signs positioned on a casino floor advertise: "100% CASH REFUND—Get all your losses back—Play 12 Hours of Slots During Your Trip—Just 1¢ per Spin!").

In one example, a casino (e.g., a casino-maintained computer system programmed to execute various processes of the present invention) may calculate that at an incremental contract fee of 1¢ per every 25¢ wagered, a casino may stand to generate a profit even after reimbursing a player for 100% of the player's losses, so long as the player plays at a reasonable rate of play (e.g., 500 game plays per hour) for a period of 12 hours. Assuming the player wagers an average of 75¢ per game play and a house edge metric of 0.08 (e.g., gaming devices 16 are programmed to statistically hold 8% of coin-in for the house), it may be determined that, statistically, the player will generate $180 in contract fees and accumulate $360 in losses during the contract period. Accordingly, as the player will be refunded the $360 loss amount, the casino may generate $180 in profit from the gaming contract. It should be noted that though gaming devices may be programmed to statistically maintain a house edge, thereby generating an 8% loss on average for players, some players may achieve a win amount as the result of contract play (such a win amount may decrease casino profits). While there may be some players who will generate a win amount during the contract period, by requiring a relatively long contract period a casino may reduce the number of such winners.

It should also be noted that, in some embodiments, while such an amount of profit may be comparably less than would have been generated had the player played for 12 hours without a gaming contract (e.g., wherein the player's losses would have been held by the casino), the gaming contract may be advantageous in that it may (i) motivate a player to play only at the gaming establishment wherein the player's losses are "covered," thereby decreasing the likelihood that the player will gamble at a competitor's property, (ii) motivate a player to gamble for longer periods of time, (iii) increase the likelihood that a gaming establishment will derive additional revenue from the player's patronage of non-gaming casino activities (e.g., eating at restaurants, attending shows), as the player is motivated to gamble only within the establishment that provided the gaming contract, (iv) increase the likelihood that a player afraid of losing a large sum of money will gamble within a gaming establishment, as the cost of playing gaming devices may be considered fixed (e.g., a player may play five hours of slot machines, with a chance to win a large jackpot, for only a flat cost of $50), and so on.

In another example of a standard gaming contract, a gaming establishment may advertise that a player may receive a 50% refund on all losses incurred within a given time period (e.g., any game play between 6 a.m. and 1 p.m.) without paying any associated contract fee. Thus, a gaming establishment may benefit by maintaining 50% of the financial losses incurred by the player, as well as by ensuring that the player's business is captured for a period of several hours.

In yet another example, a player may pay an up-front contract fee of $50 for a gaming contract lasting six hours, in which the player may be entitled to a 100% refund of all losses incurred by game play.

In yet another example, a player may pay an up-front contract fee of $20 for a gaming contract lasting one hour, in which the player may be entitled to a 100% refund of all losses incurred by game play, though the player may only use a particular type of gaming device (e.g., only Nickel Frenzy machines are eligible).

In yet another example, a player may provide a credit card when signing up for a gaming contract, which may enable the player to initiate 1,000 game plays (e.g., at 25¢ per game play) of any eligible machine, and receive a 75% refund of all incurred losses. A contract fee of $60 may be charged to the provided credit card once contract play is complete.

Thus, as standard gaming contracts may be associated with a variety of pre-established contract parameters (e.g., "Contract A" has a refund rate of 100%), certain standard gaming contracts may be unavailable to players characterized by certain player data. For example, a player eligibility rule of a player eligibility database 42B may indicate that a player who is not a registered hotel guest may not receive a gaming contract with an associated refund rate (i.e., contract parameter) of greater than 75%. Accordingly, in some embodiments, a player requesting such a gaming contract may be denied an opportunity to activate the contract. Alternately or additionally, in some embodiments, an identified player (e.g., a player inserting a player tracking card or providing a last name, such that player data may be accessed) requesting generally to receive a gaming contract (e.g., a player selects "Show me Gaming Contracts" or "I'd Like Loss Insurance" as an option of a menu output by a touch-screen kiosk 20 or IVRU) may not receive the option of selecting certain gaming contracts (e.g., gaming contracts characterized by certain parameters are not subsequently included in a menu of gaming contracts output to the player).

In some embodiments, a player may request to receive a "custom gaming contract." For example, a player may desire to toggle various contract parameters (e.g., contract period, refund rate, etc.). In one such embodiment, various contract parameters may be made available to a player based on the player's eligibility (as determined by analyzing player data). Thus, in some embodiments, players characterized by certain data (e.g., players that have established long-standing player accounts, generated large amounts of theoretical win, etc.) may select certain contract parameters (e.g., higher refund rates, longer/shorter contract periods, fewer play restrictions, lower contract fees, etc.) as indicated by player eligibility rules. For example, a player may approach a booth dedicated to administering gaming contracts, and communicate verbally to a casino representative a desire to receive a custom contract. The casino representative may then, for example, use a computer device in communication with any or all of the databases described herein (e.g., a player database 42A, a player eligibility database 42B, a gaming device eligibility database, etc.) to determine which desired contract parameters the player may be eligible to select.

In this manner, a player may identify a gaming contract characterized by a number of contract parameters. In some embodiments, before such a contract is activated, the player confirms that the player desires a gaming contract characterized by indicated contract parameters.

A confirmation may be received in a variety of manners. In one example, a player may actuate an input device of a kiosk 20 or other electronic device (e.g., gaming device 16, PDA) so as to signal confirmation (e.g., the player actuates a "YES" graphic of a touch-sensitive display screen, above which text reads "By pressing YES below, I agree to pay $50 and receive a contract card. By inserting the contract card before I play a slot machine, I will receive a 100% refund of any losses incurred between 11 a.m. and 5 p.m. today"). In another example, a player may signal confirmation verbally (e.g., by speaking to a casino representative, saying "YES" when prompted by an IVRU, etc.). In yet another example, a player may signal confirmation by actuating a button of the phone, as prompted by an IVRU (e.g., "If you would like to purchase this contract, press 1"). In yet another example, a player may signal confirmation by signing or initialing a physical contract agreement form (e.g., a paper form which describes contract parameters and includes an area for receiving a signature).

Understandably, the player usually pays for the contract. In one example, a player may tender a cash payment (e.g., a player provides cash to a casino representative, a player inserts cash into a bill acceptor of a kiosk, etc.). In other embodiments, a player may provide a credit card, which may be billed immediately. In further embodiments, a contract fee associated with a gaming contract may be added as a charge to a hotel bill associated with a player.

In some embodiments, the player commits to pay a contract fee at a later time. For example, in one embodiment, before a gaming contract is activated, a player may provide a credit card and sign a contract agreement form describing contract parameters, one of which is an incremental contract fee of 1¢ for every 25¢ wagered. Thus, at the end of the contract period, if the player wagered a total of $247.25, the player's credit card may be charged $9.89. In some embodiments, a player may provide a credit card before activating a contract, and a pre-authorization process may "freeze" amount of credit in association with the provision of the contract, such that a gaming establishment may charge up to the frozen amount of credit upon reconciliation of the gaming contract. In other embodiments, a player may establish a debit account before receiving a gaming contract. For example, a player may provide $50, which may be established as a balance of a financial account associated with the player (e.g., associated with a player identifier and/or gaming contract identifier). Thus, should the player accrue any incremental contract fees during contract play (e.g., a fee of 5¢ per every three game plays), the account balance may be decremented accordingly.

A player may then be provided with a gaming contract. In some embodiments, providing a gaming contract may comprise associating a gaming contract identifier with a gaming contract and/or a player identifier (e.g., a new record is established in a gaming contract database 42F). Thus, in some embodiments, a player may be provided with a contract identifier. In some embodiments, a player may use a contract identifier so as to signal that one or more game plays should be monitored pursuant to contract play (e.g., a player provides a contract identifier before initiating play of a gaming device 16, such that all subsequent game play data may be stored in association with a particular gaming contract).

For example, in one embodiment, a player may be provided with a contract card such as contract cards 156, 166 described with reference to FIGS. 11A-11D. As stated, in some embodiments, a contract card 156, 166 may have a substantially similar physical appearance and functionality as to that of a player tracking card, though a contract card may be associated with a unique contract identifier instead of or in addition to a player identifier (e.g., such that data may be read from and/or written to a contract database regarding the contract and/or game play data associated therewith). Turning to FIG. 11A-11D, two exemplary illustrations of such contract cards 156, 166 are depicted. Contract card 156 has a front 158 and a back 160. Front 158 includes indicia 162, which may include a player identifier, a contract identifier, and a summary of the terms of the contract. The back 160 may include a magnetic stripe, which when read by a card reader device, may indicate a gaming contract identifier and/or a player identifier. A variety of methods of encoding contract cards with contract identifiers and other data are imagined. For example, in one embodiment, a contract card comprises a "smart card" or other device comprising a memory, such that gaming contract data may be stored on the smart card (e.g., a gaming device 16 and/or controller 12 transmits data to the smart card device via radio frequency transmission). In another embodiment, a contract card may comprise a cashless gaming ticket (e.g., the barcode thereof may be read so as to determine a contract identifier). Back 160 may also include indicia 164, which spells out the terms and conditions of use of the card and/or contract. A signature line may also be provided. Other indicia may be used as needed or desired.

Card 166 is substantially similar with a front 168 and a back 170. Front 168 may include indicia 172 which may include a player identifier, a contract identifier, a photograph of the player, and a summary of the terms of the contract. The back 170 may include the magnetic stripe and indicia 174, which may spell out the terms and conditions relating to use of the card and/or contract.

In other embodiments, a player may not be provided with a contract card, but the controller 12 may determine that one or more game plays should be monitored or otherwise tracked pursuant to contract play in some other manner. For example, in one embodiment, a player may be provided with a code. The player may then enter the code using an input device 34 of a gaming device 16 (e.g., a player enters a numeric code or PIN number using a touch-sensitive display screen). In another embodiment, a player may be instructed to actuate one or more input devices 34 of a gaming device 16 in a specific sequence and/or for a particular period of time (e.g., "To initiate Contract Play, press and hold both the "Spin" button and the "Paytable" button for five seconds").

In one or more embodiments, a player identifier may be received so as to signal contract play. Various methods of receiving player identifiers are contemplated. In one embodiment, a player may use a player tracking card in lieu of a contract card (e.g., such game play data may be monitored and then stored in a player database 42A, as opposed to a contract database 42G). In another embodiment, a player may be identified by biometric means (e.g., via a retina recognition device).

Having established the contract between the player, the insurer and/or the gaming establishment, the player then begins to play. The insurer and/or the gaming establishment need to monitor and track the play of the player to determine compliance with the terms of the contract. To this end, the player identifies himself to the gaming establishment as he plays. Thus, the controller 12 may receive an initiation signal associated with a contract identifier in a variety of manners (e.g., may receive a contract identifier).

For example, a card reader device in communication with a controller 12 and/or gaming device 16 may detect the insertion of a contract card and/or player tracking card (e.g., a player is instructed to "Make sure your play is covered! Insert your Contract Card before you play any slot machine"). The card reader may then determine a contract identifier associated with the card (e.g., by reading an encoded magnetic strip and/or retrieving contract data from a database). The controller 12 receives the contract identifier from the card reader device. In some embodiments, the controller 12 receiving a contract identifier may then store game play data associated with the contract identifier, such that each time a player uses a gaming device 16, so long as a contract card is inserted into a card reader device, game play data will be stored. As stated, in other embodiments, the controller 12 may receive a contract identifier in any of the manners described above (e.g., a gaming device 16 in communication with a controller receives a PIN code representing a contract identifier via an input device 34).

As described, in some embodiments, one or more gaming devices 16 maintained by a gaming establishment (e.g., slot machines positioned on a casino slot floor) may be ineligible for contract play in association with one or more gaming contracts. Accordingly, in various embodiments of the present invention, an "eligibility indication" may be associated with a gaming device 16.

For example, in one or more embodiments, a gaming establishment may mark, equip or otherwise configure one or more gaming devices 16 to output or display a "static" eligibility indication. A static eligibility indication may inform a prospective player of the eligibility status of one or more particular gaming devices 16 (e.g., a gaming device 16 is or is not eligible for contract play), such that the indication may not change over time (e.g., the associated gaming device 16 is always ineligible for contract play pursuant to any gaming contract). A variety of static eligibility indications are contemplated within the scope of the present invention, including but not limited to stickers, signs or other physical objects affixed to or placed on or near a gaming device 16, such that text, graphics and/or icons indicate an eligibility status (e.g., a sticker reads "This machine eligible for Money Back Play"). In one example, a gaming establishment may fit all eligible machines with such eligibility indications before any gaming contracts are provided to players.

In other embodiments, a "dynamic" eligibility indication may be associated with one or more gaming devices. A dynamic eligibility indication may inform a prospective player of the eligibility status of one or more particular gaming devices 16 (e.g., a gaming device 16 is or is not eligible for contract play), such that the indication may change over time (e.g., the associated gaming device 16 may at times be eligible for contract play, and at other times not). A variety of dynamic eligibility indicators are contemplated within the scope of the present invention. In some embodiments, a dynamic eligibility indicator may comprise a light (e.g., when an LED under which text reads "Contracts OK" is lit, the machine is eligible). In other embodiments, a dynamic eligibility indicator may comprise text, icons and/or graphics output by a gaming device display screen (e.g., while a gaming device 16 is idle, an "attract mode" sequence indicates "This machine eligible for Money Back Play"). In further embodiments, a dynamic eligibility indicator may comprise a voice recording output via one or more gaming device speakers (e.g., a voice indicates "This machine eligible for Money Back Play"). Such dynamic eligibility indicators may be programmed on a periodic or continual basis such that an eligibility status associated with one or more gaming devices 16 may be changed as desired (e.g., if a payback percentage or jackpot amount associated with a machine changes, a gaming device eligibility database may indicate that the machine is no longer eligible for contract play, and thus, a status indicator may change).

In this manner, a player who has been provided with a gaming contract may recognize whether a particular gaming device 16 is eligible for contract play, so as to prevent a situation wherein a player believes a refund is due for a loss amount that was incurred by game play at an ineligible gaming device. Further, in some embodiments, a player may (i) approach an ineligible gaming device 16, (ii) provide a contract identifier, and (iii) receive an "ineligibility warning indication" (e.g., a display screen reads, "You have inserted a Contract Card, but this machine is ineligible for Contract Play. Any losses you incur will not be refunded. Would you still like to play?"). In other embodiments, a casino representative may provide an ineligibility indication warning (e.g., verbally). Thus, the step of receiving an initiation signal associated with a contract identifier may comprise determining whether or not an associated gaming device 16 is eligible for contract play, and if not, outputting an ineligibility warning indication.

As stated, in some embodiments, a player may receive a gaming contract, approach an eligible gaming device 16, and indicate a desire to initiate contract play associated with a contract identifier (e.g., the player inserts a contract card into a card reader). Accordingly, the controller 12 may store data (e.g., game play data) associated with a contract identifier.

For example, turning to FIGS. 8A & 8B, a player P-000165 may have been provided with a contract card 156 associated with a gaming contract C-000003. The gaming contract may entitle the player to receive a 100% refund of any incurred losses between 9 a.m. and 3 p.m., provided the player pays an up-front, flat contract fee of $40 and maintains a rate of play of at least 500 game plays per hour. The player may then approach a 25¢-denomination five-reel, video slot machine and insert the contract card into a card reader. The player may then establish a credit balance (e.g., the player deposits a $20 via a bill acceptor device) and begin to gamble. For example, before spinning the reels, the player may activate nine paylines at a cost of 25¢ each, thus establishing a wager amount of $2.25 (i.e., nine credits) in association with the game play. The reels may then spin, and resolve to an outcome of "lime-lime-lime-plum-bell," yielding a payout of $1.00 (i.e., payout amount) associated with the game play. Thus, a loss amount associated with the game play may be $1.25 (i.e., the payout amount subtracted from the wager amount). Play may continue in this manner for some period of time, such that the controller 12 may track aggregate wager, payout and/or win/loss figures associated with a plurality of game plays. Such aggregate data may then be stored in a contract database 42G.

Additionally, the controller 12 may determine a "period remaining" associated with a gaming contract. For example, in one embodiment, a gaming contract may comprise a contract period of a certain number of hours (e.g., six hours of game play). Thus, in one embodiment, upon receiving an initiation signal (e.g., a player inserts a contract card), the controller 12 may begin decrementing a "period remaining" field entry of the contract database 42G in accordance with the time elapsed. Further, in one or more embodiments, the controller 12 may be programmed to detect a "contract stop signal" (e.g., the player's removal of a contract card from a card reader device in communication with the controller 12). Accordingly, in one example, if a contract period comprises a certain number of hours, and a player removes a contract card from a card reader, the controller 12 may no longer decrement a period remaining record of a contract database in accordance with the time elapsed. In this manner, a player may (i) insert a contract card 156 and initiate a number of game plays associated with contract play at a first gaming device 16, (ii) remove the card 156 such that a period remaining record is no longer decremented, (iii) re-insert the card 156 at a second gaming device 16 (e.g., a second contract initiation signal is received) and continue game play associated with a gaming contract (e.g., a player may move from slot machine to slot machine, without the time spent traveling between devices being held against him).

In another embodiment, a contract period may comprise a certain time period during one or more particular days (e.g., a contract period is Aug. 31, 2004 between 9 a.m. and 3 p.m.). In one such example, a controller may decrement a "period remaining" record of a contract database as the end of the period approaches (e.g., "2 hours, 10 minutes" remain before 3 p.m.). In a further embodiment, a contract period may comprise a number of game plays (e.g., 1,000 game plays). In another embodiment, a contract period may comprise a number of hours within a range of hours (e.g., two hours between 9 a.m. and 2 p.m.). Accordingly, the controller 12 may decrement a period remaining record of a contract database 42G in accordance with each game play occurring during contract play.

It should be noted that, in some embodiments, a player may possess a gaming contract, but may knowingly or voluntarily participate in one or more game plays that are not associated with a gaming contract. For example, in one embodiment, a player may approach a gaming device 16 and insert a player tracking card instead of a contract card 156. Thus, any play that occurs while the player tracking card is inserted may not count against a gaming contract. It should be noted that an identified player associated with an active gaming contract (e.g., as indicated by a player database 42A) who attempts to initiate a game play without first signaling to initiate contract play (e.g., inserts a player tracking card instead of a contract card) may receive a warning message via any of the output devices described herein (e.g., "Your losses will not be covered. Are you sure you'd like to continue?").

In another embodiment, a player may (i) insert a contract card 156, (ii) initiate a number of game plays pursuant to contract play, and (iii) leave a gaming device 16, but forget to remove a contract card. In some embodiments, the controller 12 may be configured to detect such "breaks in play" (e.g., periods of time during which a contract card 156 is inserted during which no game plays have been initiated). For example, a contract card 156 may be inserted at 5:05 p.m. A player may then play a number of game plays, the last of which occurs at 5:23 p.m. If the contract card 156 then sits idle in the reader for a predetermined period of time (e.g., the player leaves, forgets his card, and doesn't come back for more than 10 minutes), the controller 12 may determine that only the period of time during which the machine was not idle may count toward the gaming contract (e.g., a period remaining field of a contract database is decremented by only 18 minutes, the time span from when the player inserted the card until the last game play was initiated).

In further embodiments, the controller 12 may store game play data (or any other data useful in determining compliance with one or more play requirements) in association with each game play of a gaming contract. For example, a contract outcomes database 140 may comprise a "game play-by-game play" record of such data. The contract outcomes database 140 is illustrated in FIG. 10. The contract outcomes database 140 may include a game play identifier 142, a gaming device identifier 144, a time stamp 146, an outcome 148, a wager 150, a payout 152, and a compliance status identifier 154. The gaming device identifier 144 and timestamp help identify exactly when and where a wager was made, and the outcome 148 indicates what the outcome of the wager was. The wager 150 and payout 152 show what the player wagered and received based on the outcome 148. The compliance status 154 indicates whether the particular game play was compliant with the terms of the contract. For example, the outcome "cherry-cherry-cherry" was achieved on gaming device GD-000192 at 3:10 p.m. on Aug. 31, 2004; the player wagered $1.50 and won $10.

In an exemplary embodiment, a database storing game play data (e.g., associated with a particular gaming contract) may determine and store or otherwise associate a compliance status with each game play. For example, game play "1" of gaming contract C-000001 may be determined compliant in light of play requirements indicated by one or more records of a contract requirement database 42G associated with gaming contract C-000001. For example, if the game play occurred during the indicated eligible time period (e.g., 3:10 p.m. is between 3 and 6 p.m.), on an eligible gaming device 16 (e.g., GD-000192 is between GD-000101 and GD-000599), with an associated wager amount above an indicated minimum (e.g., $1.50 is greater than 50¢), the game play may be determined "compliant" and a record of a database updated accordingly. However, as is shown by game play "2," various game plays may be determined "not compliant" if certain play requirements are violated (e.g., the player wagers less than a stated minimum wager amount). In this manner, game play data associated with each game play may be analyzed in light of one or more play requirements (e.g., each and every play requirement) to determine a compliance status, and a status indication may then be stored in association with a game play. Various other requirements such as associated incremental contract fees may analyzed similarly (e.g., if a player is required to provide an additional fee per game play, and the player does not, the game play is not compliant).

Various actions may then be taken based on a determined compliance status. For example, when a player's contract is reconciled, such a compliance status in association with one or more game plays may be considered before a refund is disbursed (e.g., such that players may not receive refunds for losses incurred via non-compliant game plays). In another example, a gaming device 16 may be operable to output a "noncompliance warning message" should it be determined that one or more game plays are not compliant in light of one or more play restrictions. For example, a player who activates three 25¢-denomination slot machine paylines (e.g., establishes a wager amount of 75¢ associated with a game play, which is greater than the 50¢ maximum as indicated by a contract requirement database) and presses spin may be prompted with a noncompliance warning message via any of the output devices described herein (e.g., a gaming device display screen indicates: "Warning! You are wagering more than is covered by your contract! Any losses you incur will not be eligible for a refund. Would you like to continue anyway?"). In a more specific example, the controller 12 may (i) receive game play data from a gaming device 16, (ii) determine a compliance status based on the game play data and one or more play requirements (e.g., stored in a database in communication with the controller 12), and (iii) send a signal to the gaming device 16 instructing the gaming device 16 to output a noncompliance warning message (e.g., such that a display screen of the gaming device 16 or of a player tracking device reads "SPIN NOT COVERED—SEE ATTENDANT"). In an alternate embodiment, a player who is not in compliance with a play restriction may not be permitted to play a gaming device 16.

It should be noted that, in some embodiments, the determination of a compliance status in association with a particular game play may occur (i) before such game play data is stored in memory, or (ii) after such game play data is stored in memory. Thus, the controller 12 may determine that various game plays are compliant or not compliant, and then store in memory (e.g., in a database in communication with the controller 12) only data associated with compliant game plays (e.g., such that when game play data is later analyzed when a contract is reconciled, only relevant data may be considered). In an example of the latter, all game play data may be stored as game results are generated, and the data may later be accessed to determine a compliance status.

In some embodiments, a player may be provided with a "gaming contract status update." For example, in one or more embodiments, a player may proactively request a status update. A player may request a status update in a variety of manners (e.g., actuating an input device 34 of a gaming device 16 or kiosk 20, dialing in to an IVRU, asking a casino representative, etc). For example, in one embodiment, a player may check the status of a gaming contract by inserting a contract card 156 into a kiosk 20 and selecting "See My Contract Status." In other, "passive" embodiments, a player may be provided with a status update without proactively requesting an update. For example, a display device in communication with the controller 12, but affixed to a gaming device 16 (e.g., an LED screen of a player tracking card reader device), may periodically output status update messages. In various embodiments, a status update mat comprise a variety of contract parameters and/or other data, including but not limited to (i) "period remaining" data, such that a player may learn how much time and/or how many game plays remain in association with a gaming contract (e.g., a display indicates "35 minutes remaining"); (ii) contract fee data, such that a player may learn of any incremental fees that have accrued in association with a gaming contract (e.g., an IVRU indicates "You have totaled $5.87 in contract fees thus far"); (iii) loss data, such that a player may learn of any losses that a player has incurred during contract play (e.g., a representative accesses contract data using a casino personnel device, and tells the player "You've accumulated $105.40 in losses so far"); (iv) refund data, such that a player may learn of any refund amount which may be due to a player (e.g., the controller 12 multiplies a loss amount by a refund rate, and determines that $45.70 is to be refunded to the customer); and so on. In one embodiment, the contract card 156 may comprise one or more input devices (e.g., a "check status button") and/or output devices (e.g., a small LED display screen), such that the card may be configured to output status updates.

Once the contract period is completed, the gaming contract may be reconciled. For example, a contract period may be completed once (i) a particular amount of time elapses since a contract play begins (e.g., a player receives a "two hours" contract card, and totals two hours of game play during which the card was inserted at one or more slot machines), (ii) a particular time of day is reached (e.g., if a player purchases a "9 a.m.-3 p.m." contract, the contract period is over at 3 p.m.), and/or (iii) a predefined amount of game play has occurred (e.g., a player has played all 3,000 game plays allotted as part of a gaming contract). It should be noted that once a contract period is completed, a "contract complete" indication may be output to a player (e.g., by one or more of the output devices described herein).

In some embodiments, reconciling a gaming contract may then comprise providing a refund based at least in part on the data stored in contract outcomes database 140. In general, it may be advantageous to record the refund that is due as a debt, an account payable, or another form that is readily managed by known accounting systems.

Figure 12:
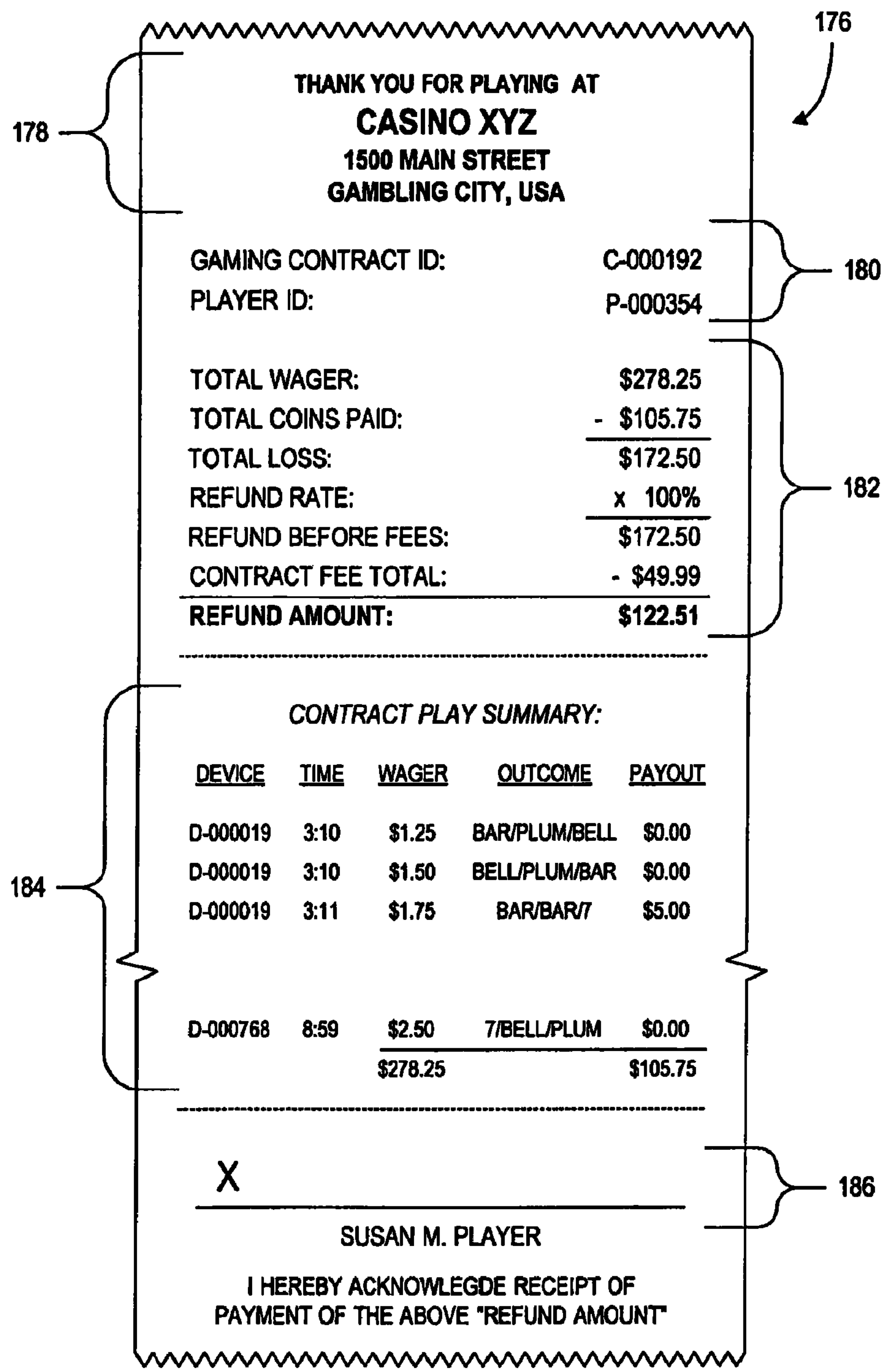
FIG. 12 illustrates a contract receipt according to some embodiments of the present invention.

In one example, a player may have purchased a contract with an associated refund rate of 100% and contract fee of 1¢ per 25¢ wagered. After a contract period concludes, the player may have accumulated $135.87 in losses and $13.17 in contract fees. Accordingly, as the player is owed a refund, the player may approach a casino representative stationed at a location within the casino. The player may provide his contract card 156 to the representative, such that she may access contract data (e.g., the representative enters a contract identifier using a keypad of a computer device in communication with one or more databases of the present invention). It may then be determined that the player is owed $122.70 (e.g., the refund amount of $135.87, minus the $13.17 in contract fees). The representative may then pay the player in cash, as well as provide a physical contract receipt 176 as illustrated in FIG. 12. The contract receipt my have a logo 178, an identifier 180, which may include a contract identifier and/or player identifier, a tally 182 with total wager, payout, loss and refund information along with any contract fees associated with the contract such that a financial account balance associated with the contract is presented to the reader, a record of outcomes summary 184 that summarizes all the game play covered by the contract. Finally, the contract receipt my have a signature line 186 that allows a player to indicate their understanding of the information on the contract receipt 176, acceptance thereof, and acknowledgement of receipt of any refund due the player. In other embodiments, a contract receipt may not comprise a physical contract receipt. For example, in one embodiment, text and/or graphics representative of a contract receipt may be output by a display screen of a kiosk 20.

In another example, a player may provide a credit card to purchase a contract with an associated refund rate of 75% and a contract fee of $50. Thus, in some embodiments, a $50 charge may be pre-authorized (or "frozen") in association with the player's credit card, as is known in the art (e.g., $50 in funds are reserved against the card's credit limit, though this may not be the amount that is ultimately charged). After a contract period concludes, the player may have accumulated $85 in losses. Accordingly, the player may then approach a contract kiosk 20, insert a contract card 156, and be presented with a menu of options (e.g., "Purchase a contract extension," "Review your contract," "Settle your contract and receive a receipt"), from which the player may elect to reconcile a contract (e.g., the player selects "Settle your contract"). Thus, as the player may be entitled to a refund amount of $63.75 (i.e., 75% of $85), the player's credit card may be charged $13.75, (e.g., the refund amount owed to the customer minus the $50 contract fee). It should be noted that, in an alternate embodiment, a player may be provided with a refund amount in cash (e.g., a kiosk outputs $63.75 in cash via a benefit output device), while the player's credit card may be charged the contract fee amount (e.g., $50 is charged to the player's credit card).

In yet another example, a player may establish a $80 balance in a financial account associated with a gaming contract. The gaming contract may allow the player to receive a 100% refund on any losses incurred over the course of a 12 hours of game play, and a contract fee associated with the contract may decrement the financial account balance by $1 every 150 game plays. Thus, the player may have initiated 9,435 game plays, totaling $62 in contract fees which may be decremented against the account balance (i.e., leaving the player with an $18 account balance). The player may have also accumulated $302.40 in losses during contract play. Accordingly, once the contract period concludes (e.g., a display device of a card reader device outputs a "contract complete" indication to the player after 12 hours of play are complete), the player may dial-in to an IVRU of the present invention, and be provided with a menu of options (e.g., "Press '1' to reconcile your contract, press '2' to extend your contract . . . "), such that the player may indicate a desire to reconcile a contract (e.g., the player presses the appropriate button of a cellular phone keypad). Accordingly, an IVRU in communication with the controller 12 of the present invention may indicate that a casino representative must be dispatched to a particular location on the casino floor (e.g., to a particular gaming device 16, as identified by the player when prompted by the IVRU). Thus, a representative may approach the player, and provide a refund payment of $320.40 (i.e., the refund amount plus the remaining financial account balance), as well as a contract receipt 176.

Further, in some embodiments, providing a refund amount to a player may comprise updating casino accounting data so as to reflect the payment (e.g., a debit of $53.05 from a casino account is marked as being paid to player P-000529 pursuant to a refund associated with gaming contract C-011245).

Further still, in some embodiments, upon the conclusion of a contract period (e.g., exactly four hours of a four-hour gaming contract elapse), a player may be provided with a "contract period complete" message. Such a message may be output via any of the output devices described herein.

Still further, in one embodiment, a third party may process the management and payment of refunds. For example, a third party may (i) determine a refund amount due to a player, (ii) pay the player the refund amount, and/or (iii) charge the casino/operator for the refund amount. Such an embodiment may be advantageous in freeing the casino from the associated operating overhead of managing payment of refunds.

Further, as described, in some embodiments, a player may generate various game plays which may not be compliant with one or more play restrictions associated with a gaming contract. In one example, a player may wager $1 on ineligible gaming device, such that any wins or losses that result may not be considered. In another example, a player may accumulate $9.25 in losses on a slot machine during a time of day when the player is not covered, such that the accumulated losses may not be considered when determining a refund. Thus, in some embodiments of the present invention, when considering game play data associated with a player and/or gaming contract, only certain data (e.g., compliant data) may be considered when determining a refund. It should also be noted that a player may voluntarily participate in one more game plays that are understood not to be "covered" as part of a gaming contract (e.g., the player willingly plays without inserting a contract card 156).

In some embodiments, a compliance status may be determined at various times or periods. For example, an evaluation of game play data (e.g., in light of one or more play requirements) to determine compliance may be performed (i) as the data is being received (or substantially at the time the data is being received), (ii) at some period after the data is received (e.g., seconds or minutes after the data is received; hours, days or weeks after the data is received; etc). Likewise, in some embodiments, game play data may be accessed for compliance evaluation on a periodic or non-periodic basis. For example, game play data may be evaluated every hour, every day at midnight, etc.

In other embodiments, the evaluation of game play data may be triggered by a player request for a refund associated with a gaming contract (or other benefit, as described further herein). For example, the player may request a refund by actuating an input device 34 of a gaming device 16, and in response, the controller 12 and/or gaming device 16 may determine a compliance status based on stored game play data and/or one or more play requirements. In another example, game play data is stored, but may only be accessed and/or evaluated if a player requests a refund (or other benefit).

Alternatively or additionally, such data may be evaluated based on when it is received (e.g., as it is received, as soon as resources are available after receipt of the data, based on a queue of received data, etc.).

In some embodiments, if it is determined that a player is compliant, a player may receive other benefits besides a refund. For example, a player may receive any or all of a payout, a favorably altered probability (e.g., an increased likelihood of achieving one or more particular winning outcomes), complimentary points, merchandise, services, and so on.

In some embodiments, a variety of compliance statuses other than "compliant" and "noncompliant" may be determined. For example, a player may achieve a particular tier, ranking or percentage of compliance that is less than 100% compliant but greater than noncompliant. For example, if a game play associated with a player and/or gaming contract meets some but not all specified play requirements (e.g., a player plays during an appropriate contract period, and on an appropriate gaming device 16, but does not wager over a certain threshold amount), a player may attain only a certain tier, ranking or percentage of compliance for that game play. A refund or other benefit may then be provided based on the tier, ranking or percentage achieved in association with one or more game plays. For example, if a player wagers 80% of what is required by the terms of a contract, he may receive only an 80% refund for that game play. In another example, a player may receive a different type of benefit for game plays during which the player was less than 100% compliant (e.g., a player gets some amount of complimentary points for game plays during which he is less than 100% compliant).

In some embodiments, more than one player identifier may be associated with a contract identifier. For example, two players may together receive a multiplayer gaming contract (e.g., two player identifiers are associated with a single gaming contract identifier, and two contract cards 156 comprising the same contract identifier are issued). Accordingly, two or more players may simultaneously engage in contract play (e.g., all game plays initiated by two players are associated with contract play). In one embodiment, game play initiated by two or more players may have a cumulative effect of decrementing a "period remaining" associated with a gaming contract. For example, if two players receive a gaming contract characterized by an eight-hour contract period, a first player may insert a contract card into a card reader associated with a first gaming device 16, and a second player may simultaneously insert a second contract card into a card reader associated with a second gaming device 16. Each player may then play for 30 minutes with the contract card 156 inserted, such that a "period remaining" record of a gaming contract database 42F may be decremented by one hour. Further, in some embodiments, other data may be aggregated in association with a gaming contract provided to more than one player (e.g., two or more loss amounts are totaled, two or more wager amounts are totaled, etc.), such that a refund amount may be provided to one or more players (e.g., one player accepts a refund amount on behalf of two players, a first and second player each receive half of a total refund amount, etc.).

In some embodiments, a player may be provided with a "cash advance amount." For example, in one embodiment, a player may have paid $100 to receive a gaming contract entitling the player to receive a 100% refund on all losses incurred by game play between 11 a.m. and 9 p.m. Accordingly, the player may incur a substantial amount of losses before the contract period ends (e.g., by 5 p.m.), such that the player may have spent through a gambling budget. Thus, the player may have no more cash with which to wager, though the player may desire to play further, as the player may be entitled to a 100% refund on all losses (e.g., the player thinks, "Even if I spend more cash, I'll get a refund for it all anyway at the end of the contract, so I can't really lose any more money than the $100 contract fee I spent already"). Accordingly, the player may request a cash advance amount. A request for a cash advance may be received by a variety of entities described previously herein (e.g., gaming devices 16, kiosks, casino representatives operating computing devices, etc.). In some embodiments, a cash advance may comprise a payment of a refund amount (e.g., or portion thereof) that is already due to a customer. For example, a player may have incurred $200 in losses before a contract period concludes. Thus, the player may approach a casino representative, who may pay the player $200 in cash (i.e., a cash advance comprises an "early settlement" of a gaming contract, such that the player may no longer be entitled to receive a refund for the $200 he was paid). In other embodiments, a player may be loaned a cash advance amount, such that the loan amount may be reflected during a contract reconciliation process described herein (e.g., when a player reconciles a contract, a player owes any contract fees and loan amounts, less any refund amounts due). In some embodiments, a fee may be associated with a cash advance (e.g., $1 per cash advance). In one such embodiment, a cash advance fee amount may be agreed upon as a parameter of a gaming contract (e.g., before a contract is provided to the player, the player agrees to pay a $2 fee associated with any cash advance subsequently provided to a player).

In some embodiments, a player may be restricted from receiving a gaming contract if the player has previously abused a gaming contract program as determined by a gaming establishment. For example, in some embodiments, a player may initiate a number of game plays that are not consistent with an acceptable manner of play (e.g., a player initiates no game plays during the first several hours of a gaming contract, then initiates a large amount of game plays during the final 30 minutes). Accordingly, such a player may be "flagged" as a problem player, such that the player is no longer to be provided with a gaming contract or provided a gaming contract with certain contract parameters. For example, a "problem flag" may appear in association with a player identifier of a player database 42A, and a rule of a player eligibility database 42B may indicate that should there be a "problem flag," the player may not be eligible to receive a contract.

In one embodiment, a play restriction may indicate a period of time during which one or more particular gaming devices 16 or type of gaming devices 16 must be played. For example, a play restriction associated with a gaming contract may stipulate that a first gaming device 16 type (e.g., "Any video poker machine") must be played for at least a certain period of time during the contract (e.g., one hour), and a second gaming device type (e.g., "Wild West Win Slots") must be played for at least a certain period of time during the contract (e.g., 20 minutes).

In some embodiments, a gaming contract may be valid at more than one gaming establishment. For example, a player may purchase a gaming contract entitling the player to receive a 50% refund on any losses incurred during the month of April at any "Casino XYZ" property. In this manner, the player may gamble at a first property maintained by Casino XYZ on a first day in April, and gamble at a second property maintained by Casino XYZ on a second day in April, and expect to have 50% of all the player's losses refunded.

In another embodiment, a player may purchase a gaming contract from a contract facilitator (e.g., "Gaming Contract Company X"), such that the contract is valid at any indicated properties with which the contract facilitator has partnered (e.g., a player purchases a "Las Vegas Casino Pass" from Gaming Contract Company X). In this manner, various systems (e.g., controllers, kiosks, etc.) that are produced, operated and/or owned by a contract facilitator may be installed in one or more participating casinos.

As stated, in some embodiments, the controller 12 may be configured to detect various "breaks in play" (e.g., a player leaving a contract card in a card reader device without initiating a game play for a period of time), such that the time which a player is not playing a device may not count against a contract (e.g., a value in a "period remaining" field of a contract database is not decremented). In one such embodiment, the time a player spends in a "bonus round" or other secondary game may not be counted against a gaming contract.

As is known in the art, player tracking cards typically provide players with an amount of "complimentary points" based on game play (e.g., a player earns one point for each game play, such that a player may later redeem such points for merchandise or other benefits). In one embodiment of the present invention, a player may earn such traditional "comp points" during contract play. In another embodiment, a player may not earn such traditional comp points during contract play. For example, a player who has an active gaming contract and wants to earn comp points must insert a traditional player tracking card. Accordingly, the controller 12 may be configurable to detect whether a player wishes to play for comp points, or play as part of a gaming contract (e.g., depending on the type of card the player inserts into a reader device).

In some embodiments, a player may receive a "gaming contract extension." For example, a player may have purchased a gaming contract entitling the player to receive a 100% refund of all losses incurred within six hours of game play. As described previously, after six hours have elapsed (e.g., a "period remaining" field of a contract database is completely decremented), a contract period may be completed, such that a player may not receive a refund associated with any further play. Thus, a contract extension may allow a player to receive a longer contract period (e.g., the player gains another hour of play during which any losses will be covered by a 100% refund). A player may be provided with a contract extension in a variety of manners. In one example, a player whose contract period has concluded may approach a casino representative and pay a fee (e.g., $10 per hour) to receive a contract extension (e.g., such that the representative uses a computer device in communication with one or more databases of the present invention to update one or more parameters associated with the player's contract). In another example, a player may approach a kiosk 20 and select an "Add time" option from a menu of options output via a display screen. In some embodiments, a player may select or otherwise be provided with an "automatic extension" option, such that should a player's contract period conclude (e.g., the player completes six hours of play), the player may remain eligible for a refund if the player continues to play. For example, an automatic extension parameter associated with a gaming contract may stipulate that once an initial contract period concludes, a player may be entitled to one or more "contract extension periods" (e.g., one hour increments of time), with which a "contract extension fee" may be associated (e.g., $10 for the first additional hour, $15 for the second additional hour, etc.). Additionally, similar or different contract parameters may be associated with one or more contract extension periods (e.g., a refund rate is 100% during an initial contract period, but falls to 90% during a contract extension period). Thus, in one example, a player may purchase a gaming contract for six hours of play with a 100% refund rate. After the six hours elapse, the player may continue to play (e.g., a contract card remains inserted in a card reader device and the player continues to play even after a "contract period complete" message is output to a player as described). Accordingly, contract data (e.g., game play data) may then be stored in association with (i) the original gaming contract identifier, and/or (ii) a newly-created contract extension identifier.

In some embodiments, a player may be provided with a "bonus contract extension" if certain criteria are met (e.g., a contract extension for which no fee is associated). For example, a player may be provided with a "free extra hour" of coverage if the player (i) plays during a certain period of time (e.g., "Play for one hour before 7 a.m., and get an extra hour FREE after 5 p.m."), (ii) maintains a certain rate of play (e.g., "Average more than 600 spins per hour, and get an hour of coverage for FREE"), (iii) wagers a certain amount in association with one or more game plays (e.g., "Wager more than $4000 during your contract and get an hour FREE"), and so on.

In accordance with some embodiments, gaming device output device(s) 32 may be configured to output information (e.g., received from the controller 12 and/or contract kiosk 20) pertaining to one or more statuses (and/or other information) associated with a gaming contract. For example, a gaming device LCD (or other output device) may display information pertaining to the status of a particular gaming contract to an associated player (e.g., based on a player identifier, gaming device identifier and/or contract identifier). Such status information may include for example: an amount of elapsed time or number of elapsed spins associated with the gaming contract; an amount of time or number of spins remaining subject to the contract; a net present refund amount associated with the contract (e.g., a dollar amount and/or percentage of total session wager or session loss that may be refunded to the player); net present win/loss associated with the contract; an amount of wager remaining subject to the contract; an indication of one or more game play parameters required to fulfill the contract; offers or instructions to renegotiate or reestablish an existing contract; offers or advertisements outlining other available contracts or contract terms and parameters; the status of another gaming contract (e.g., the status of a wife's gaming contact may be output to her husband at a gaming device 16 associated with the husband's player identifier); information indicating that the terms of a contract have been fulfilled; and/or information indicating that the player is in breach of the terms of a given contract (e.g., a text message indicating "In order to be eligible a loss refund, you may wager only one coin per line"). Such information may be provided and/or updated on a continuous basis (e.g., after each wager or handle pull) and/or periodic basis (e.g., the information may be updated twenty times or at regular intervals over the course of a given contract). Accordingly, players may be apprised of various statuses or other information associated with one or more gaming contract(s) while executing play at a gaming device. Alternatively, the execution of game play may not be necessary in order for a player to inquire or ascertain the status of his or her gaming contract at a gaming device 16. For example, various functions of a contract kiosk 20 may be incorporated into that of a gaming device 16, such that a player may utilize a gaming device 16 in order to inquire about and ascertain (e.g., status) information pertaining to a particular gaming contract (e.g., by inputting a contract card 156 to a gaming device card reader and actuating an "acquire contract status" button of a gaming device 16). Further, in some embodiments, status information may be output to a player's cellular phone (e.g., an IVRU may be configured to periodically dial a player's number and output status information). Contract status information may be output at a gaming device 16 via a dual-use output device 32 (e.g., an LCD capable of outputting both a player's current credit balance and various contract status information) and/or via a dedicated output device 32 (e.g., a peripheral device with display screen dedicated to solely outputting contract status information).

In some embodiments, game play that may have occurred prior to the purchase or provision of a game contract may be considered contract play, such that the prior game play may "count" toward the contract. For example, a player may have previously executed 100 slot machine spins, and the wager amounts and/or results thereof may have been stored in association with the player (e.g., game play data is stored in association with a player tracking identifier). Accordingly, such data may be accessed and considered when settling such a gaming contract (e.g., an amount of losses associated with the prior game play are determined, such that a refund amount may be determined at least in part based on the prior losses incurred).

Rules of Interpretation

To assist in understanding the embodiments of the present invention, a number of terms are defined explicitly herein followed by more generalized interpretative guidelines.

As used herein, the terms "controller", "central controller", "casino server", slot server", and "server" mean an electronic device (e.g., a computer) that communicates with one or more peripheral devices (e.g., a card reader affixed to a gaming device), kiosks (e.g., a "contract kiosk" as described further herein), gaming devices, and/or any other devices described herein (e.g., computer devices operated by casino personnel). In some embodiments, a controller may perform a variety of "player tracking" and/or "slot accounting" functions. Thus, a controller in communication with a gaming device may be configured to, among other things, (i) identify players (e.g., by detecting the insertion of a player tracking card), (ii) detect gaming contract initiation signals (e.g., by detecting the insertion of a contract card), and/or (iii) monitor, record or otherwise receive game play data associated with players or gaming contracts (e.g., by measuring statistics such as wager amounts, payout amounts, win/loss amounts, and so on).

Thus, the server may contain or otherwise be configured to read data from and/or write data to one or more databases regarding data associated with a particular player, gaming contract and/or gaming session. In some embodiments, a server may control the actions of gaming devices.

As used herein, the term “game” means a wagering activity whereby a player posts consideration, usually monetary in form, in exchange for a chance at winning a payout. The definition is intended to include basic games and bonus games.

As used herein, the terms “game device, gaming device” and “gaming machine” mean any electrical, mechanical or electro-mechanical device that, in a manner well known in the art, accepts wagers, determines an outcome and pays winnings based on the outcome. The outcome may be randomly generated, as with a slot machine; may be generated through a combination of randomness and player skill, as with video poker; or may be generated entirely through player skill. Gaming devices may include slot machines (both video and mechanical reels), video poker machines, video blackjack machines, video roulette machines, video keno machines, video bingo machines, pachinko machines, video lottery terminals, handheld gaming devices (such as mobile terminals, cellular phones, personal digital assistants (PDAs)), and the like. A gaming device may comprise a personal computer (e.g., which communicates with an online casino Web site) or a telephone (e.g., to communicate with an automated sports book that provides gaming services.

As used herein, the terms “game play”, “play”, “handle pull”, and “spin” mean a single play of a game at a gaming device that generates a singular, corresponding outcome (e.g., a player pulls the handle of a slot machine and the reels resolve to “bar-lemon-plum”). In some embodiments, a game play may comprise a bonus round. It should be noted that, in some instances, the term “game play” may refer to any number of game plays. Further, in some embodiments, a compliance status may be associated with one or more game plays as described herein (e.g., if a wager amount is lower than a minimum required wager amount, a “noncompliant” status may be associated with the game play).

As used herein, the term “game play data” means information associated with one or more game plays. In some embodiments, a game play data may be associated with (i) a player (e.g., as uniquely identified by a player identifier, such as P-000001), (ii) a gaming contract (e.g., as uniquely identified by a gaming contract identifier, such as GC-000001), and/or (iii) a particular gaming device (e.g., identified uniquely by a certain code). Game play data may comprise various statistics related to game play, including but not limited to (i) wager data (e.g., a monetary amount wagered by a player in association with one or more game plays), (ii) payout data (e.g., a monetary amount won by a player in association with one or more game plays), (iii) win/loss data (e.g., a monetary result of one or more game plays, which may be determined by subtracting a wager amount from a payout amount), (iv) payline data (e.g., a number of slot machine paylines activated by a player in association with one or more game plays), (v) time data (e.g., an amount of time elapsed between and/or during one or more game plays), and so on. Thus, game play data may comprise a number of game plays initiated in association with a particular player and/or gaming contract (e.g., player P-000001 has played 1,238 handle pulls). Further, as stated, in some embodiments, a compliance status may be determined based on game play data and one or more play requirements.

As used herein, the terms “game session”, “gaming session”, and “session” mean a gambling event with a beginning and end that may encompass a number of game plays. The end of the session may be determined voluntarily (in which the player elects to stop play) or involuntarily (in which the gaming device and/or controller terminates play). In some embodiments, a session may begin when a player inserts a contract card, and end when a contract is reconciled or otherwise completed. In some embodiments, a player may pay a fixed price for a game session comprising (i) a predetermined number of game plays, or (ii) a period of time during which an indeterminate number of game plays may ensue. Apparatus and methods which, among other things, permit and enable various ways of providing gaming contracts and game sessions such as prepaid or flat-rate play sessions, and which are appropriate for use in accordance with the present invention are disclosed in previously incorporated U.S. Pat. No. 6,077,163, as well as previously incorporated U.S. Patent Publication 2002/0147040.

As used herein, “gaming contract”, “contract”, and “insurance contract” mean an agreement between a player and a gaming establishment relating to game play provided by the establishment. In some embodiments, a refund may be provided to a player based on a determined loss amount incurred as the result of one or more game plays initiated during a contract period. In some embodiments, a contract period may comprise (i) a predetermined number of game plays, or (ii) an indeterminate number of game plays to be initiated within a predetermined period of time (e.g., one hour). Further, in some embodiments, a gaming contract may be provided only if a player (i) pays or agrees to pay a premium, fee or surcharge, which may be associated with one or more game plays and/or wager amounts (e.g., an incremental 1¢ fee is assessed for every 25¢ wagered by the player; the player pays a flat $30 premium for two hours of insured play), and/or (ii) agrees to a predetermined contract period (e.g., 12 hours of slot play; 6,000 handle pulls, 25,000 lines played, etc.). Still further, in some embodiments, a refund or other benefit may only be provided if it is determined that a compliance status is satisfactory in association with one or more game plays.

As used herein, “gaming contract data” and “contract data” mean information pertaining to various parameters of a gaming contract, including but limited to (i) game play data associated with the contract, (ii) a refund rate associated with the contract, (iii) contract fees associated with the contract, (iv) a contract period associated with the contract, (v) play requirements associated with the contract, and so on.

As used herein, “gaming contract play”, “contract play”, and “insured play” mean one or more game plays which result from or are otherwise associated with a gaming contract (e.g., all game plays initiated by a player during a contract period).

As used herein “player tracking card” describes the fact that most casinos issue plastic cards (resembling frequent shopper cards) to players as a way of identifying the player at a slot machine or table game. As is well known in the art, such cards typically have encoded thereon (in machine-readable and/or human readable form) a player identifier (e.g., a six digit number) which uniquely identifies the player (e.g., because the number is associated with a record in a player database that includes corresponding player information). The player inserts the card into a reader device affixed to a gaming device (i.e., a peripheral device), and the player identifier is read from the card, most often magnetically or optically. From the player identifier, the corresponding player information may in turn be read from a database, typically via a network connection between the reader device and a device hosting the database (e.g., a controller).

In some embodiments, a player establishing a gaming contract may receive a contract card. In some embodiments, a contract card may have a substantially similar function and appearance as to that of a player tracking card, though a contract card may alternately or additionally be associated with a unique contract identifier (e.g., such that data may be read from and/or written to a database regarding the contract and/or game play data associated therewith).

Of course, in some embodiments, a compliance status may be determined in association with other considerations besides gambling insurance policies. For example, a compliance status may be determined in association with a problem gambling consideration. For example, recommended boundaries or limitations of play may be associated with one or more players (e.g., all players of a casino, a particular identified player with a pattern or history of problem gambling, etc.). For example, a system of the present invention may track such statistics as wager amounts per game play, total wagered over a particular duration, total amount won, frequency of buy-in, rate of play, etc. Compliance status may then be determined based on the data. For example, if a player wagers more than a threshold amount over time, he may be non-compliant. In another example, if a player reinvests more than a threshold percentage of his winnings, he may be non-compliant.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this patent application) nor the Abstract (set forth at the end of this patent application) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" means any one or more microprocessors, CPU devices, computing devices, microcontrollers, digital signal processors, a dedicated hardware circuit, an appropriately programmed general-purpose computer, or any other equivalent electronic, mechanical or electro-mechanical device.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

In general, as used herein, "memory" may comprise an appropriate combination of magnetic, optical, and/or semiconductor memory, and may include, for example, RAM, ROM, a compact disc, and/or a hard disk. The memory may be located entirely within a single device or dispersed amongst various devices connected to each other device by a remote communication medium.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

Some embodiments can be configured to work in a network environment including a computer that is in communication, via a communications network, with one or more devices. While LANs are specifically contemplated, other communications networks may be used and devices may communicate over the communications networks directly or indirectly, via a wired or wireless medium such as wide area network (WAN), Ethernet, Token Ring, over the Internet through a Web site maintained by computer on a remote server or over an online data network including commercial online service providers, bulletin board systems and the like. In yet other embodiments, the devices may communicate with one another and/or the computer over RF, cable TV, telephone lines, optical communications line, satellite links, or via any appropriate communications means or combination of communications means. A variety of communication protocols may be part of the system 10, including, but not limited to: Ethernet (or IEEE 802.3), SAP, SAS™, ATP, Bluetooth™, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device and various component devices and/or peripheral devices (e.g., printers, bill acceptors, etc.), (ii) the Best of Breed (BOB) standard, which may facilitate communication between a gaming device and various servers related to play of one or more gaming devices (e.g., servers that assist in providing accounting, player tracking, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations).

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present disclosure.

The invention is claimed as follows:

1. A gaming system comprising:

at least one gaming device including:
- (a) at least one input device;
- (b) at least one display device;
- (c) at least one processor; and
- (d) at least one memory device which stores a plurality of instructions which, when executed by the at least one processor, cause the at least one processor to operate with the at least one display device and the at least one input device to display a play of a wagering game to a player; and at least one controller configured to operate with the at least one gaming device, said at least one controller programmed to:
- (a) determine if the player is eligible to enter into a contract, wherein:
  - (i) said determination is based on player eligibility data associated with the player; and
  - (ii) said contract is associated with:
    - (A) a contract period, and
    - (B) a benefit to be provided to the player when the contract period is complete; and
- (b) if the player is determined to be eligible to enter into the contract;
  - (i) enable the player to enter into the contract;
  - (ii) if the player enters into the contract, when the contract period is complete:
    - (1) determine a value of the benefit associated with the contract based on an amount of money lost by the player in any displayed plays of the wagering game which:
      - (A) occur during the contract period, and
      - (B) are determined to be compliant with the contract; and
    - (2) if at least one displayed play of the wagering game during the contract period is determined not to be compliant with the contract, determine the value of the benefit associated with the contract independent of any amount of money lost by the player in said at least one non-compliant play of the wagering game; and
  - (iii) cause the determined value of the benefit associated with the contract to be provided to the player.

2. The gaming system of claim 1, wherein the player eligibility data associated with the player is associated with a player tracking database.

3. The gaming system of claim 1, wherein the at least one controller is programmed to determine the contract period based on the player eligibility data.

4. The gaming system of claim 1, wherein the at least one controller is programmed to determine the benefit, at least in part, based on the player eligibility data.

5. The gaming system of claim 1, wherein the contract period is at least one selected from the group consisting of: a duration of game play defined by an amount of time and a duration of game play defined by a quantity of game plays.

6. The gaming system of claim 1, wherein the at least one controller is programmed to determine, for each of the displayed plays of the wagering game which occur during the contract period, whether said play is compliant with the contract based on at least one determination selected from the group consisting of:

(i) a determination that the at least one gaming device on which said play of the wagering game was conducted is approved for play under the contract, (ii) a determination that said play of the wagering game was conducted within a period of time defined by the contract, (iii) a determination that said play of the wagering game was conducted at a minimum rate, and (iv) a determination that a minimum wager amount was placed for said play of the wagering game.

7. The gaming system of claim 1, wherein the at least one controller is programmed to cause the at least one gaming device to display a non-compliant message if at least one of the displayed plays of the wagering game is determined to be not compliant with the contract.

8. A gaming device comprising:

at least one input device;

at least one display device;

at least one processors; and at least one memory device which stores a plurality of instructions which, when executed by the at least one processor, cause the at least one processor to operate with the at least one display device and the at least one input device to:

(a) determine if a player is eligible to enter into a contract, wherein:

(i) said determination is based on player eligibility data associated with the player; and (ii) said contract is associated with:

(A) a contract period, and (B) a benefit to be provided to the player when the contract period is complete; and (b) if the player is determined to be eligible to enter into the contract;

(i) enable the player to enter into the contract (ii) if the player enters into the contract, when the contract period is complete:

(1) determine a value of the benefit associated with the contract based on an amount of money lost by the player in any displayed plays of a wagering game which:

(A) occur during the contract period, and (B) are determined to be compliant with the contract; and (2) if at least one displayed play of the wagering game during the contract period is determined not to be compliant with the contract, determine the value of the benefit associated with the contract independent of any amount of money lost by the player in said at least one non-compliant play of the wagering game; and (iii) provide to the player the determined value of the benefit associated with the contract.

9. The gaming device of claim 8, wherein the player eligibility data associated with the player is associated with a player tracking database.

10. The gaming device of claim 8, wherein when executed by the at least one processor, the plurality of instructions cause the at least one processor to determine the contract period based on the player eligibility data.

11. The gaming device of claim 8, wherein when executed by the at least one processor, the plurality of instructions cause the at least one processor to determine the benefit, at least in part, based on the player eligibility data.

12. The gaming device of claim 8, wherein the contract period is at least one selected from the group consisting of: a duration of game play defined by an amount of time and a duration of game play defined by a quantity of game plays.

13. The gaming device of claim 8, wherein when executed by the at least one processor, the plurality of instructions cause the at least one processor to determine, for each of the displayed plays of the wagering game which occur during the contract period, whether said play is compliant with the contract based on at least one determination selected from the group consisting of:

(i) a determination that said play of the wagering game was conducted within a period of time defined by the contract, (ii) a determination that said play of the wagering game was conducted at a minimum rate, and (iii) a determination that a minimum wager amount was placed for said play of the wagering game.

14. The gaming device of claim 8, wherein when executed by the at least one processor, the plurality of instructions cause the at least one processor to operate with the at least one display device to display a non-compliant message if at least one of the displayed plays of the wagering game is determined to be not compliant with the contract.

15. A method of operating a gaming system, said method comprising:

(a) causing at least one processor to execute a plurality of instructions to determine if a player is eligible to enter into a contract, wherein:

(i) said determination is based on player eligibility data associated with the player; and (ii) said contract is associated with:

(A) a contract period, and (B) a benefit to be provided to the player when the contract period is complete; and (b) if the player is determined to be eligible to enter into the contract:

(i) enabling the player to enter into the contract;

(ii) if the player enters into the contract, causing the at least one processor to execute the plurality of instructions to, when the contract period is complete:

(1) determine a value of the benefit associated with the contract based on an amount of money lost by the player in any displayed plays of a wagering game which:

(A) occur during the contract period, and (B) are determined to be compliant with the contract; and (2) if at least one displayed play of the wagering game during the contract period is determined not to be compliant with the contract, determine the value of the benefit associated with the contract independent of any amount of money lost by the player in said at least one non-compliant play of the wagering game; and (iii) providing to the player the determined value of the benefit associated with the contract.

16. The method of claim 15, wherein the player eligibility data associated with the player is associated with a player tracking database.

17. The method of claim 15, which includes causing the at least one processor to execute the plurality of instructions to determine the contract period based on the player eligibility data.

18. The method of claim 15, which includes causing the at least one processor to execute the plurality of instructions to determine the benefit, at least in part, based on the player eligibility data.

19. The method of claim 15, wherein the contract period is at least one selected from the group consisting of: a duration of game play defined by an amount of time and a duration of game play defined by a quantity of game plays.

20. The method of claim 15, which includes causing the at least one processor to execute the plurality of instructions to determine, for each of the displayed plays of the wagering game which occur during the contract period, whether said play is are compliant with the contract based on at least one determination selected from the group consisting of:

(i) a determination that a gaming device on which said play of the wagering game was conducted is approved for play under the contract, (ii) a determination that said play of the wagering game was conducted within a period of time defined by the contract, (iii) a determination that said play of the wagering game was conducted at a minimum rate, and (iv) a determination that a minimum wager amount was placed for said play of the wagering game.

21. The method of claim 15, which includes causing the at least one processor to execute the plurality of instructions to operate with at least one display device to display a non-compliant message if at least one of the displayed plays of the wagering game is determined to be not compliant with the contract.

22. The method of claim 15, which is provided through a data network.

23. The method of claim 22, wherein the data network is an internet.

* * * * *

UNITED STATES PATENT AND TRADEMARK OFFICE

CERTIFICATE OF CORRECTION

PATENT NO. : 8,414,384 B2
APPLICATION NO. : 13/156668
DATED : April 9, 2013
INVENTOR(S) : Jay S. Walker et al.

It is certified that error appears in the above-identified patent and that said Letters Patent is hereby corrected as shown below:

IN THE CLAIMS

In Claim 6, Column 40, Line 66, replace “the” with --any--.
In Claim 7, Column 41, Line 16, delete “of”.
In Claim 7, Column 41, Line 17, delete the first instance of “the” and replace “plays” with --play--.
In Claim 8, Column 41, Line 22, replace “processors” with --processor--.
In Claim 8, Column 41, Line 38, after “contract” insert --;--.
In Claim 13, Column 42, Line 7, replace the second instance of “the” with --any--.
In Claim 14, Column 42, Line 24, delete the first instance of “of the” and replace “plays” with --play--.
In Claim 20, Column 43, Line 12, replace the first instance of “the” with --any--.
In Claim 20, Column 43, Line 14, delete “are”.
In Claim 21, Column 44, Line 11, delete the first instance of “of the” and replace “plays” with --play--.

Signed and Sealed this
Second Day of July, 2013

Teresa Stanek Rea
*Acting Director of the United States Patent and Trademark Office*